US011493097B2

(12) United States Patent
Lin et al.

(10) Patent No.: US 11,493,097 B2
(45) Date of Patent: Nov. 8, 2022

(54) LOWER PAIR ARC STOP-BLOCK OVERRUNNING CLUTCH

(71) Applicant: Xining Kejin Industrial Design Co., Ltd, Qinghai (CN)

(72) Inventors: Ming Lin, Shenzhen (CN); Baohua Huang, Shenzhen (CN)

(73) Assignee: Xining Kejin Industrial Design Co., Ltd, Qinghai (CN)

( * ) Notice: Subject to any disclaimer, the term of this patent is extended or adjusted under 35 U.S.C. 154(b) by 752 days.

(21) Appl. No.: 16/754,369

(22) PCT Filed: Jul. 10, 2015

(86) PCT No.: PCT/CN2015/083787
§ 371 (c)(1),
(2) Date: Apr. 7, 2020

(87) PCT Pub. No.: WO2017/004838
PCT Pub. Date: Jan. 12, 2017

(65) Prior Publication Data
US 2022/0003279 A1 Jan. 6, 2022

(30) Foreign Application Priority Data
Jul. 3, 2015 (CN) .......................... 201510391966.7

(51) Int. Cl.
*F16D 41/067* (2006.01)
*F02N 15/02* (2006.01)
(Continued)

(52) U.S. Cl.
CPC ......... *F16D 41/067* (2013.01); *F02N 15/023* (2013.01); *F16D 41/061* (2013.01); *F16D 2041/0605* (2013.01)

(58) Field of Classification Search
CPC ...... F16D 41/067; F16D 41/061; F16D 41/06; F16D 2041/0605; F16D 47/02; F16D 7/021; F02N 15/023
See application file for complete search history.

(56) References Cited

U.S. PATENT DOCUMENTS 1,618,915 A * 2/1927 Constantinesco ..... F16D 41/073
192/41 R
2,785,782 A * 3/1957 Dodge .................. F16D 41/073
192/45.005

(Continued)

FOREIGN PATENT DOCUMENTS

CN    104132079 A * 11/2014

*Primary Examiner* — Ernesto A Suarez
*Assistant Examiner* — Lori Wu
(74) *Attorney, Agent, or Firm* — United One Law Group LLC; Kongsik Kim; Jhongwoo Peck

(57) ABSTRACT

The invention discloses a lower pair arc stop-block overrunning clutch comprising an outer rotating element, an inner rotating element, a friction block assembly, a wedge assembly, a first propeller assembly, a first elastic element and a synchronized push-block assembly, wherein a plurality of friction blocks of the friction block assembly are connected end to end and arranged between a first rotating ring and a second rotating ring; an drive element drives the first propeller assembly to press the synchronized push-block assembly to achieve synchronization of the friction block assembly; the first propeller assembly strikes the friction block assembly and is relatively stationary to push the friction block assembly for generating reverse rotation relative to a driven element; the wedge assembly is wedged to generate a radial pressure on the friction block assembly so that the friction block assembly can achieve lower pair arc stop, thereby achieving the transfer of torque.

28 Claims, 18 Drawing Sheets

(51) Int. Cl.
*F16D 41/061* (2006.01)
*F16D 41/06* (2006.01)

(56) References Cited

U.S. PATENT DOCUMENTS

2010/0051402 A1* 3/2010 Yamamoto ............ F16D 41/066
192/45.011
2018/0031056 A1* 2/2018 Krenn .................... F16D 41/066
192/45.011

* cited by examiner

LOWER PAIR ARC STOP-BLOCK OVERRUNNING CLUTCH

BACKGROUND

1. Field of the Invention

The present invention relates to a clutch, in particular, to a lower pair arc stop-block overrunning clutch.

2. Related Arts

Overrunning clutch is a basic part that appears with the development of mechatronic products. It is mainly used for the important components of the power transmission and separation between the drive shaft and the driven shaft in the mechanical equipment. Their own clutch function can be achieved by using the speed change or transfer of rotating direction of the drive, driven element. When the drive element drives the driven element to rotate together, it is called the wedging state; when the drive element and the driven element are separated and rotated at the respective speeds, it is called the overrunning state.

The existing overrunning clutches mainly include a ratchet overrunning clutch, a roller overrunning clutch and a wedge overrunning clutch. The ratchet overrunning clutch mainly includes a ratchet wheel, a drive pawl, a non-return pawl and a machine frame, and it conducts stepwise rotation by the movement of drive ratchet pushing the ratchet wheel. As the only level adjustment for clutch stroke in the ratchet overrunning clutch and the noise and impact wear easily caused by the pawl sliding on the tooth back, such clutch is not suitable for high-speed occasions; in the roller overrunning clutch, since the torque and the friction force are mainly transmitted through the rollers, the force transmitting units mainly contact with each other through linear contact, and the area of the stress is often increased by increasing the number of the rollers in the prior art, there nevertheless is a big limitation, i.e. the service life of products in high load situations is still not long; in the wedge overrunning clutch, the selection of wedging angle cannot be balanced with the wear resistance and the torque transmitting performance, and the smaller the wedging angle is, the better the wedging performance is, however, as the wedges reduce the effective friction layer that is used to withstand wear and the wear resistance deteriorates, the working life of the wedges will reduce, in addition, if the wedge angle is increased, the wedging performance is relatively weakened though the effective friction layer is increased and the abrasion resistance is enhanced, thereby leading to a significant reduction of torque withstand performance of the overrunning clutch.

The higher-pair transmission of existing overrunning clutches such as point contact or linear contact cannot capable of withstanding large torques and at the same time serious heating phenomenon resulted from long-time operation is inevitably led by, though, achieving the capacity of increasing torque through increasing contact areas. Its structural characteristics determine the limitation on application and low service life, making the working reliability and use performance of equipment utilizing overrunning clutch become significantly lower.

SUMMARY

In view of the existing deficiency of prior art, the present invention provides a lower pair arc stop-block overrunning clutch with strong withstanding capacity, sensitive reaction, wear resistance, long service life and improvement for heating while increasing effectively the working reliability and use performance of equipment utilizing overrunning clutch.

In order to achieve above purpose, the present invention employs the following technical schemes:

A lower pair arc stop-block overrunning clutch, wherein, comprising:

an outer rotating element including an annular first rotating ring;

an inner rotating element provided in the outer rotating element, including an annular second rotating ring concentric with the first rotating ring;

a friction block assembly including a plurality of friction blocks forming a closed ring shape by connecting end to end successively, two adjacent friction blocks overlapping partially, the friction block assembly being arranged between the first rotating ring and the second rotating ring; the outer surface of the friction block is provided with an arc wedge surface and the inner surface is an cambered-surface stop surface, the friction block is provided with a first propeller mounting part close to the head thereof, which includes a first limit part close to the end surface of the head of the friction block and a second limit part away from the end surface of the head of the friction block;

a wedge assembly provided between the first rotating ring and the wedge surface for allowing the outer rotating element to only rotate unidirectional relative to the friction block assembly;

a first propeller assembly arranged slidably on the first propeller mounting part in a circumferential direction and limited by the first limit part and the second limit part, the first propeller assembly including a first traction element, which is driven by the inner rotating element for a snap-fit or a gap-fit with the second rotating ring;

a first elastic element arranged between the two adjacent friction blocks for elastically pushing the two adjacent friction blocks in opposite directions to keep the two away from each other;

a synchronized push-block assembly provided at the overlap of the two adjacent friction blocks for overcoming the action of the first elastic element under the thrust of the first propeller assembly to keep the two adjacent friction blocks close to each other.

wherein the number of the friction blocks is two.

Wherein the wedge assembly includes a plurality of parallel spaced roller and the wedge surface includes several sunken parts and raised parts arranged alternately, the roller achieving wedging or de-wedging by rolling towards or away from the raised parts.

Wherein, the wedge assembly further comprises a roller frame including two parallel supporting plates and a spacing retaining element provided between the two supporting plates, each supporting plate being provided with a plurality of spaced long holes, the head on both ends of the roller penetrating through the long holes and slidable in the length direction of the long holes; the supporting plate is provided at both sides of the axial end surface of the friction block.

Wherein, the roller frame further includes roller pre-loaded elements having one end fixed with respect to the supporting plate, each of the roller pre-loaded elements pushing the head along the length direction of the long holes.

Wherein the roller pre-loaded element is an elastic tab and the supporting plate is provided inside with a pre-loaded element accommodating slot communicating with the long holes, the roller pre-loaded element being in a state of compression to snap into the pre-loaded element accommodating slot with one end thereof pushing elastically the head.

Wherein the end faces at the head and the tail of the friction block are provided with a first lapping part and a second lapping part, and the first lapping part of each friction block is arranged overlapping with the second lapping part of the adjacent friction block; the synchronized push-block assembly is provided with a push arm for being pushed by the first propeller assembly and a push-block body driving the two adjacent friction blocks to keep close to each other.

Wherein the first lapping part and the second lapping part are provided with a first insert hole and a second insert hole respectively, the synchronized push-block assembly simultaneously penetrating through the first insert hole and the second insert hole and compress the first elastic element under the thrust of the first propeller assembly to increase the amount of overlap of the first lapping part and the second lapping part.

Wherein the opposed surfaces of the synchronized push-block assembly are provided with a first cooperating part and a second cooperating part assuming concave arc respectively, the side wall of the first insert hole close to the end surface of the head and the side wall of the second insert hole close to the end surface of the tail are plugged movably with a stick body used for contacting cooperation with the first cooperating part and the second cooperating part.

Wherein the first propeller assembly further includes a third elastic element provide at the head thereof, which is used to push against the first propeller assembly towards the second limit part.

Wherein the first propeller assembly includes a first fixed base, a first protruding block being provided to protrude from the bottom of the first fixed base; the first propeller mounting part of the friction block is provided with a first through hole extending in a circumferential direction, the first protruding block being slidably provided in the first through hole along a circumferential direction.

Wherein the first traction element is a rolling stick and the bottom of the first propeller assembly is provided with a first groove accommodating the first traction element; a bottom surface of the first groove is provided with a first inclined surface on a side close to the head of the first propeller assembly and the closer to the head of the first propeller assembly, the smaller the distance of the first inclined surface from the second rotating ring.

Wherein the first propeller assembly further includes a second elastic element provided between the first rotating ring and the first traction element, the second elastic element pushing against the first traction element towards the second rotating ring to make the first traction element contact elastically with the second rotating ring.

Wherein the first propeller assembly further includes a first movable tab and the bottom surface of the first fixed base is provided with a first limit groove, the first movable tab being arranged in the first limit groove; the second elastic element is compressed between the bottom surfaces of the first movable tab and the first limit groove and the first fixed base cooperates with the first movable tab to form the first groove.

Wherein the first propeller assembly is provided with a first pre-loading assembly used for elastically pushing against the first traction element towards the first inclined surface on a side of the first groove away from the first inclined surface.

Wherein the head of the first propeller assembly is provided with a spring decompression assembly used for pushing against the synchronized push-block assembly, the spring decompression assembly being compressed to generate elastic deformation after the synchronized push-block assembly is stationary relative to the friction block assembly.

Wherein the first propeller assembly further includes a plurality of first rolling needles for contacting with the first rotating ring arranged between the first fixed base and the first rotating ring.

Wherein each of the first propeller assemblies includes a plurality of the first grooves and each of the first grooves is provided with one of the first traction elements inside.

The purpose of the present invention is to provide another lower pair cambered-surface stop-block type overrunning clutch, comprising:

an outer rotating element including an annular first rotating ring;

an inner rotating element provided in the outer rotating element, including an annular second rotating ring concentric with the first rotating ring;

a friction block assembly including a plurality of friction blocks forming a closed ring shape by connecting end to end successively, the friction block assembly being arranged between the first rotating ring and the second rotating ring, the inner surface of the friction block is provided with an wedge surface and the outer surface is a cambered-surface stop surface, the friction block is provided with a first propeller mounting part close to the head thereof, which includes a first limit part close to the end surface of the head of the friction block and a second limit part away from the end surface of the head of the friction block;

a wedge assembly provided between the second rotating ring and the wedge surface for allowing the inner rotating element to only rotate unidirectional relative to the friction block assembly;

a first propeller assembly arranged slidably on the first propeller mounting part in a circumferential direction and limited by the first limit part and the second limit part, the first propeller assembly including a first traction element, which is driven by the outer rotating element for a snap-fit or a gap-fit with the second rotating ring;

a first elastic element, both ends of the first elastic element being respectively fixed on the end surfaces of two adjacent friction blocks for drawing the two adjacent friction blocks;

a synchronized push-block assembly provided between the end surfaces of the two adjacent friction blocks for overcoming the action of the first elastic element under the thrust of the first propeller assembly to separate the two adjacent friction blocks.

Wherein the wedge assembly includes a plurality of parallel spaced roller and the wedge surface includes several sunken parts and raised parts arranged alternately, the roller achieving wedging or de-wedging by rolling towards or away from the raised parts.

Wherein, the wedge assembly further comprises a roller frame including two parallel supporting plates and a spacing retaining element provided between the two supporting plates, each supporting plate being provided with a plurality of spaced long holes, the head on both ends of the roller penetrating through the long holes and slidable in the length direction of the long holes; the supporting plate is provided at both sides of the axial end surface of the friction block.

Wherein, the roller frame further includes roller pre-loaded elements having one end fixed with respect to the supporting plate, each of the roller pre-loaded elements pushing the head along the length direction of the long holes.

Wherein the opposed surfaces of the synchronized push-block assembly are provided with a first cooperating part and a second cooperating part assuming concave arc respectively, and the end surfaces of the head and tail of the friction block are plugged movably with a stick body used for contacting cooperation with the first cooperating part and the second cooperating part, respectively.

Wherein the first propeller assembly further includes a third elastic element provide at the head thereof, which is used to push against the first propeller assembly towards the second limit part.

Wherein the first propeller assembly includes a first fixed base, a first protruding block being provided to protrude from the top of the first fixed base; the first propeller mounting part of the friction block is provided with a first through hole extending in a circumferential direction, the first protruding block being slidably provided in the first through hole along a circumferential direction.

Wherein the first traction element is a rolling stick and the bottom of the first propeller assembly is provided with a first groove accommodating the first traction element; a top surface of the first groove is provided with a first inclined surface on a side close to the head of the first propeller assembly and the closer to the head of the first propeller assembly, the smaller the distance of the first inclined surface from the second rotating ring.

Wherein the first propeller assembly further includes a first movable tab and the bottom surface of the first fixed base is provided with a first limit groove, the first movable tab being arranged in the first limit groove; the second elastic element is compressed between the bottom surfaces of the first movable tab and the first limit groove and the first fixed base cooperates with the first movable tab to form the first groove.

Wherein the first propeller assembly is provided with a first pre-loading assembly used for elastically pushing against the first traction element towards the first inclined surface on a side of the first groove away from the first inclined surface.

Wherein the head of the first propeller assembly is provided with a spring decompression assembly used for pushing against the synchronized push-block assembly, the spring decompression assembly being compressed to generate elastic deformation after the synchronized push-block assembly is stationary relative to the friction block assembly.

Wherein the first propeller assembly further includes a plurality of first rolling needles for contacting with the second rotating ring arranged between the first fixed base and the second rotating ring.

The present invention provides a friction block assembly, a first propeller assembly and a synchronized push-block assembly between the inner and outer rotating elements, wherein the friction block assembly is composed of a plurality of friction blocks connected end to end to form an annular structure, which achieves synchronous rotation of the plurality of friction blocks in the friction block assembly by driving the first propeller assembly to move through the drive element in the inner and outer rotating elements and the first propeller assembly pushing the synchronized push-block assembly; the first propeller assembly strikes the friction block assembly and is relatively stationary to push the friction block assembly for generating reverse rotation relative to the driven element so that the wedge assembly is wedged to generate a radial pressure on the friction block assembly, then the cambered-surface stop surface of the friction block assembly holds tightly the drive element and the friction block assembly achieves lower-pair cambered-surface stop with the drive element and locks with the driven element by wedging, respectively, thus truly achieving lower-pair stop through the cooperation between the friction block assembly and the cambered-surface of rotating elements, improving maximally the capacity of withstanding torque for the overrunning clutch, being able to be applied in a variety of working occasions of high-speed, large torque and strong impact. Compared with prior art, the overrunning clutch of the present invention has a more sensitive reaction, better wear resistance performance, ultra-long service life, and serious heat phenomenon will not occur even after a long-time, high-intensity operation.

DETAILED DESCRIPTION

In order that the objectives, technical schemes and advantages of the present invention will become more apparent, the present invention will be described in more detail with reference to the drawings and examples above. It should be understood that the specific embodiments described herein are only for illustrating but not for limiting the present invention.

Embodiment 1

Figure 1:
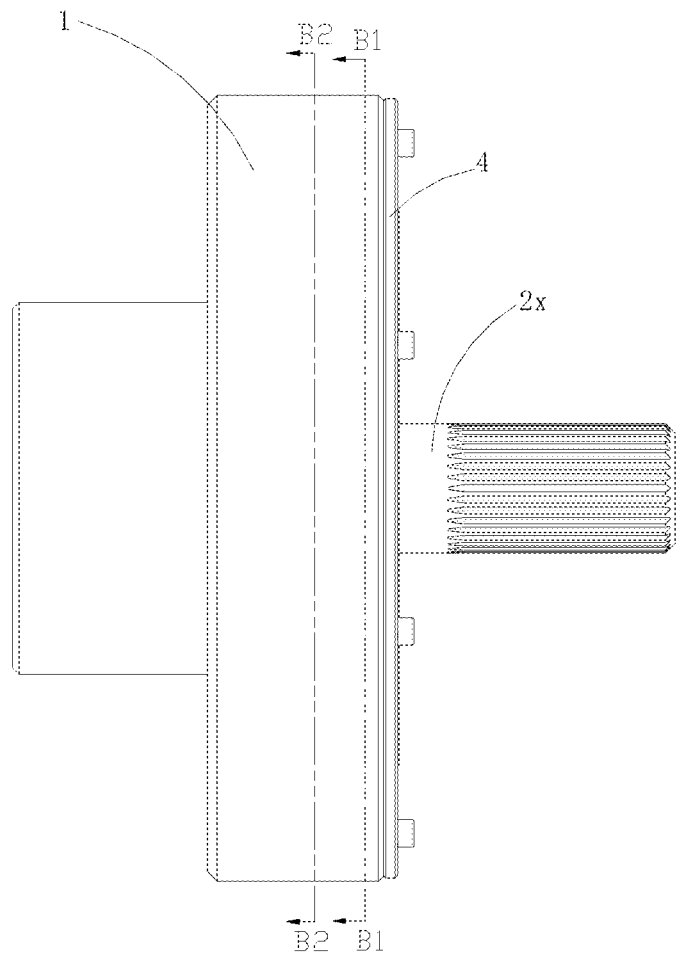
FIG. 1 is side view of lower pair cambered-surface stop-block type overrunning clutch of Embodiment 1 of the present invention.
Figure 2:
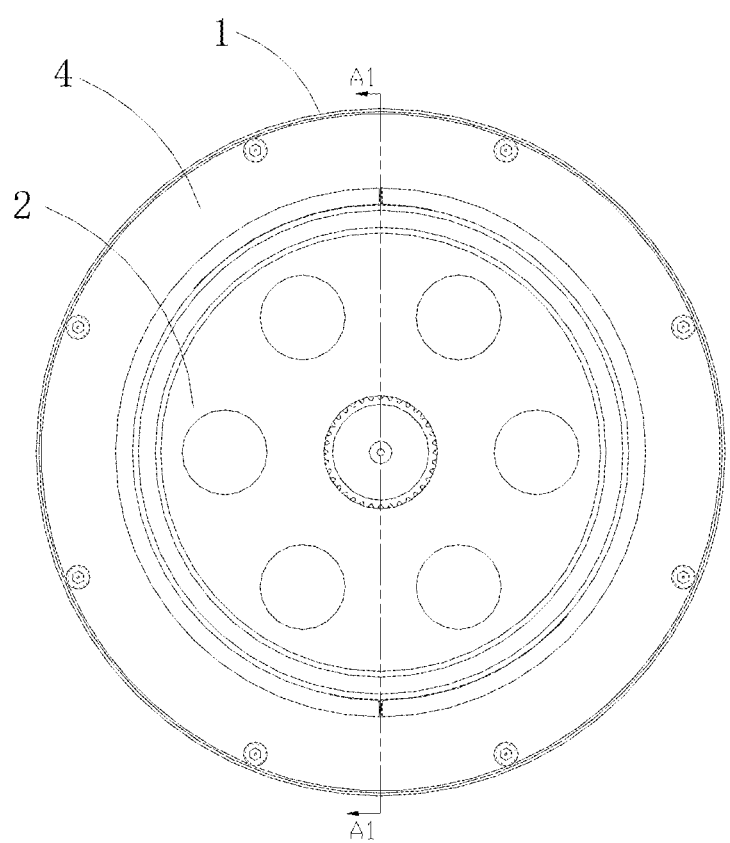
FIG. 2 is a side view of lower pair cambered-surface stop-block type overrunning clutch of Embodiment 1 of the present invention.
Figure 3:
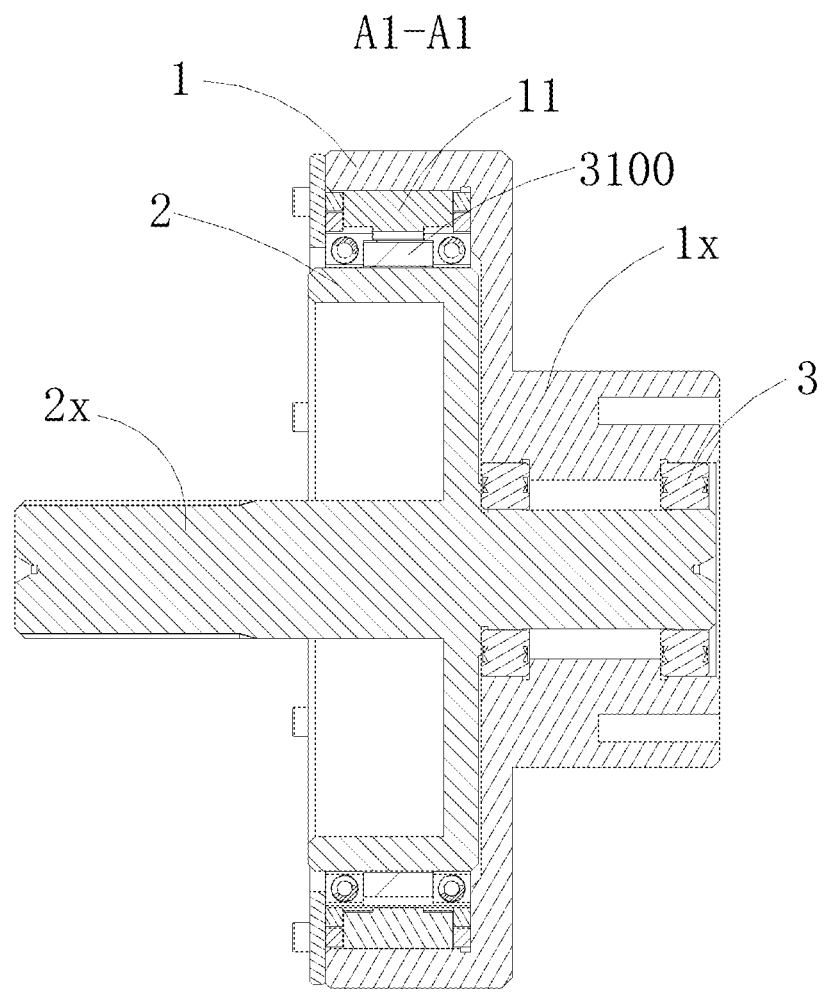
FIG. 3 is a section structural view taken from A1-A1 in FIG. 2.

With reference to FIG. 1-3, the overrunning clutch of the present invention comprises an outer rotating element 1, an inner rotating element 2 and a clutch cover plate 4, wherein the outer rotating element 1 includes a shaft sleeve 1x and the inner rotating element 2 includes a shaft 2x; one end of the shaft 2x is fixed with a bearing 3 and the outer surface of the bearing 3 snaps into the shaft sleeve 1x so that the inner rotating element 2 can rotate more smoothly relative to the outer rotating element 1. When the inner rotating element 2 is mounted to the clutch cover plate 4 on the rear cover in the outer rotating element 1, the axial clearance of the structure in the outer rotating element 1 during rotation can be limited.

The outer rotating element 1 and inner rotating element 2 can be connected to an external transmission mechanism respectively by the shaft sleeve 1x and shaft 2x for application onto various occasions of toque transmission. When the inner rotating element 2 rotates relative to the outer rotating element 1 counter-clockwisely as shown in FIG. 2, the inner rotating element 2 and the outer rotating element 1 do not transmit torques with each other, instead, remain respective rotation state, then the overrunning clutch is in the overrunning state at this point; when the inner rotating element 2 rotates relative to the outer rotating element 1 clockwisely, no relative rotation between the inner rotating element 2 and the outer rotating element 1 but synchronous rotation occurs to transmit torques, then the overrunning clutch is in the engaging state at this point.

It should be noted that both "clockwise" and "counter-clockwise" rotation direction of the present invention refer to FIG. 2 for being ready to describe, and the inner rotating element 2 is considered as a drive element and the outer rotating element 1 as a driven element, wherein both "head" and "tail" refer to the "head" and "tail" in clockwise direction.

Figure 4:
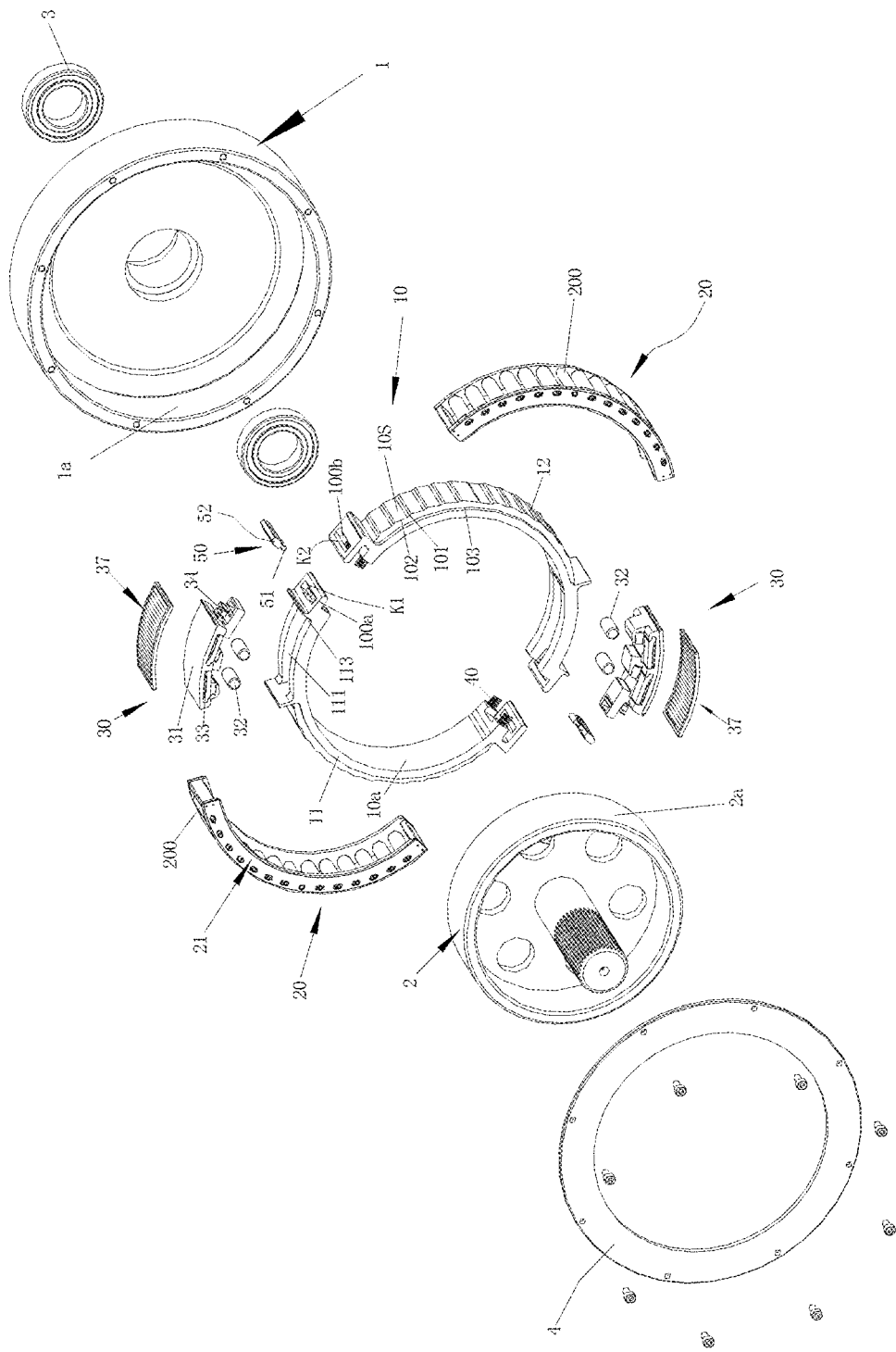
FIG. 4 is a structure decomposition view of lower pair cambered-surface stop-block type overrunning clutch of Embodiment 1 of the present invention.

Wither reference to FIG. 4, the lower pair cambered-surface stop-block type overrunning clutch of the present invention comprises an outer rotating element 1, an inner rotating element 2, a friction block assembly 10, a wedge assembly 20, a first propeller assembly 30, a first elastic element 40 and a synchronized push-block assembly 50, wherein the outer rotating element 1 includes an annular first rotating ring 1a; the inner rotating element 2 is provided in the outer rotating element 1, including an annular second rotating ring 2a concentric with the first rotating ring 1a; the friction block assembly 10 is provided between the first rotating ring 1a and the second rotating ring 2a, including a plurality of friction blocks connected end to end and over-lapped partially to form a closed annular shape; the friction block assembly 10 cooperates with the outer rotating element 1 by way of wedging and an cambered-surface stop surface 10a of the inner surface of the friction block assembly 10 can cooperate with the inner rotating element 2 by way of cambered-surface clamping.

In order to ensure the insistence of force experienced by each friction block and each assembly cooperated therewith, here, ever friction block has entirely the same structure. And in order to avoid unnecessary interference caused by uncoordinated movement, non-synchronization or excessively-complicate experienced force among friction blocks, between each friction block and the corresponding connection assembly due to excessive number of friction blocks, the number of friction blocks should be better selected as two. In the following, two friction blocks will be taken as an example for description.

Figure 5:
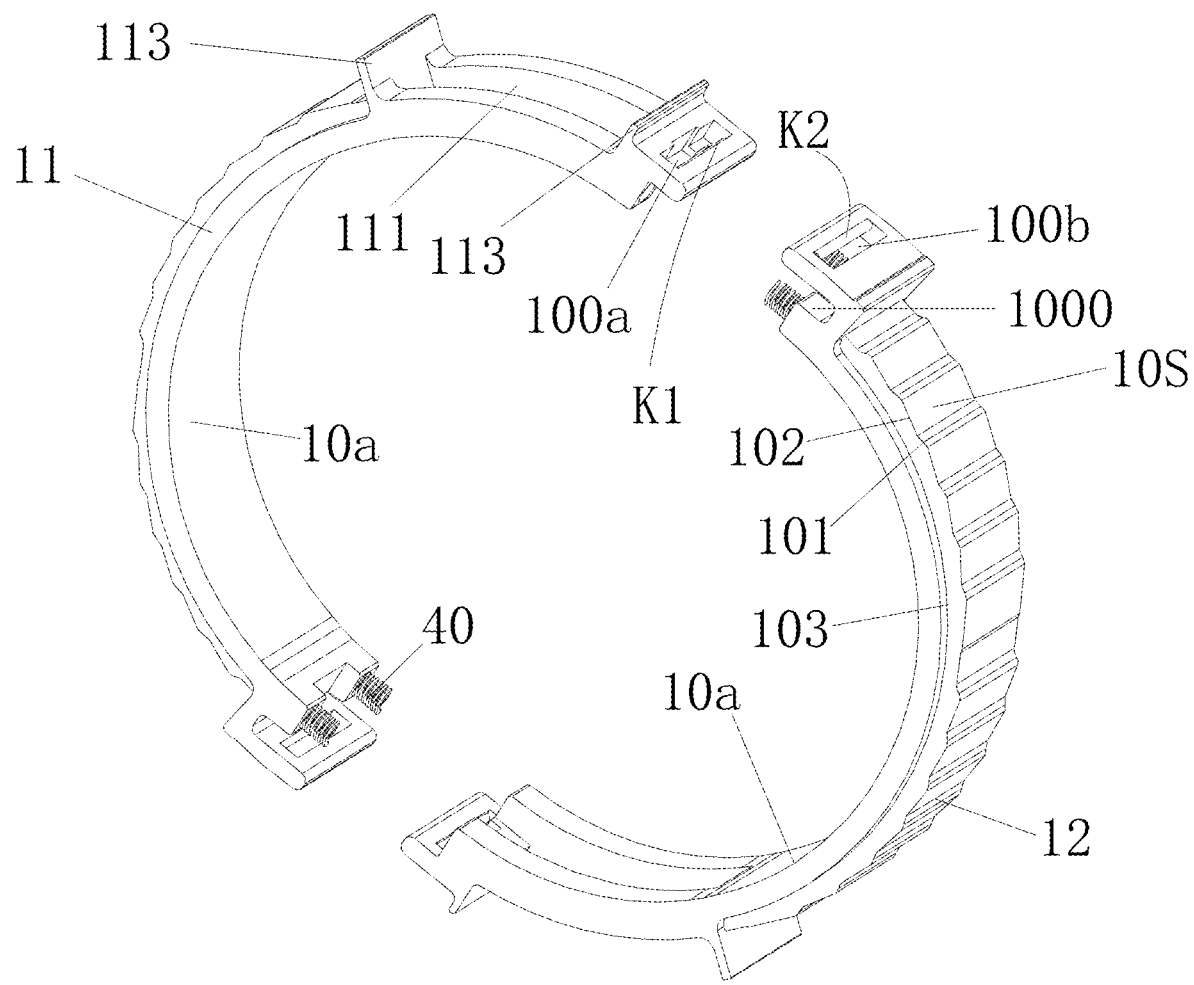
FIG. 5 is a structural view of friction block assembly of Embodiment 1 of the present invention.

With reference to FIG. 5, the friction block assembly 10 is provided between the first rotating ring 1a and the second rotating ring 2a, including two friction blocks: a left friction block 11 and a right friction block 12, which are connected end to end and overlaps partially to form a closed annular shape. The friction block 10 is provided correspondingly with a first propeller mounting part (not shown) close to the head thereof, and the first propeller assembly 30 can be arranged slidably on the first propeller mounting part in a circumferential direction; the first elastic element 40 is provided between the end surfaces of the left friction block 11 and the right friction block 12 for elastically pushing the left friction block 11 and the right friction block 12 in opposite directions to keep the two away from each other; the synchronized push-block assembly 50 is provided at the overlap of the left friction block 11 and the right friction block 12 for overcoming the action of the first elastic element 40 under the thrust of the first propeller assembly 30 to keep the left friction block 11 and the right friction block 12 close to each other with the second rotating ring 2a as a fulcrum so as to clamp tightly the inner rotating element 2.

The radians of both left friction block 11 and the right friction block 12 are larger than 180°, and the overlapping parts of the two overlap to form a closed annular shape so as to be clamped at the second rotating ring 2a by the cambered-surface stop surface 10a. The end faces at the head and the tail of each friction block are provided with a first lapping part (not shown) and a second lapping part (not shown) respectively, wherein the first lapping part forms as a plate body protruding from the end face at the head of the friction block, and the second lapping part is arranged by two radially-spaced plate bodies to form a lapping gap 1000, the first lapping part can be plugged into this lapping gap 1000. At the same time, the first lapping part and the second lapping part are provided with a first insert hole 100a and a second insert hole 100b respectively for the synchronized push-block assembly 50 to penetrate, here, the length of the first insertion hole 100a and the second insertion hole 100b in the circumferential direction is slightly larger than the thickness of the synchronized push-block assembly 50 so that there is a certain margin for activity after the synchronized push-lock assembly 50 is inserted.

Here, the friction block assembly 10 cooperates with the first rotating ring 1a of the outer rotating element 1 by way of wedging using rollers so that the outer rotating element 1 can only rotate unidirectional relative to the friction block assembly 10. Specifically, the wedge assembly 20 is a roller assembly having a plurality of parallel spaced rollers 200, and correspondingly a wedge assembly mounting part (not shown) used for mounting the wedge assembly 20 is provided on the outer surfaces of the left and right friction blocks 11, 12. In order to achieve roller-wedging, the surface of the wedge assembly mounting part is provided with a serrated wedge surface 10S used for cooperating with the circumferential surface of the roller 200, wherein the wedge surface 10S includes several sunken parts 101 and raised parts 102 arranged alternately. When the friction block assembly 10 is wedging with the outer rotating element 1, the roller 200 is snapped into the raised part 102, and the friction block assembly 10 is stationary relative to the outer rotating element 1 while rotating synchronously; when the friction block assembly 10 is de-wedging with the outer rotating element 1, the roller 200 is in the sunken part 101, capable of rotating relative to the first rotating ring 1a, thus the friction between the friction block assembly 10 and the first rotating ring 1a can be reduces.

At the same time, the first propeller mounting part of each friction block is provided with a first through hole 111 extending in a circumferential direction and both sides of each friction block in the length direction of the first through hole 111 are provided with a first limit stopper 113; the region between two first limit stoppers 113 is the first propeller mounting part, and the two first limit stoppers 113 correspond to the first limit part of the first propeller mounting part close to the end surfaces of the head of friction block 11, 12 and the second part of the first propeller mounting part away from the end surfaces of the head of friction block 11, 12, respectively. The length of the first propeller mounting part in the circumferential direction is greater than that of the first propeller assembly 30 so that the first propeller assembly 30 can move back and forth between the two first limit stoppers 113, thereby achieving contact and separation of the synchronized push-block assembly 50 and the first limit stopper 113.

In addition, the wedge assembly mounting part is provided a step part 103 in both sides of the width direction of each friction block, and the wedge assembly mounting portion is disposed adjacent to the first propeller mounting portion.

Figure 6:
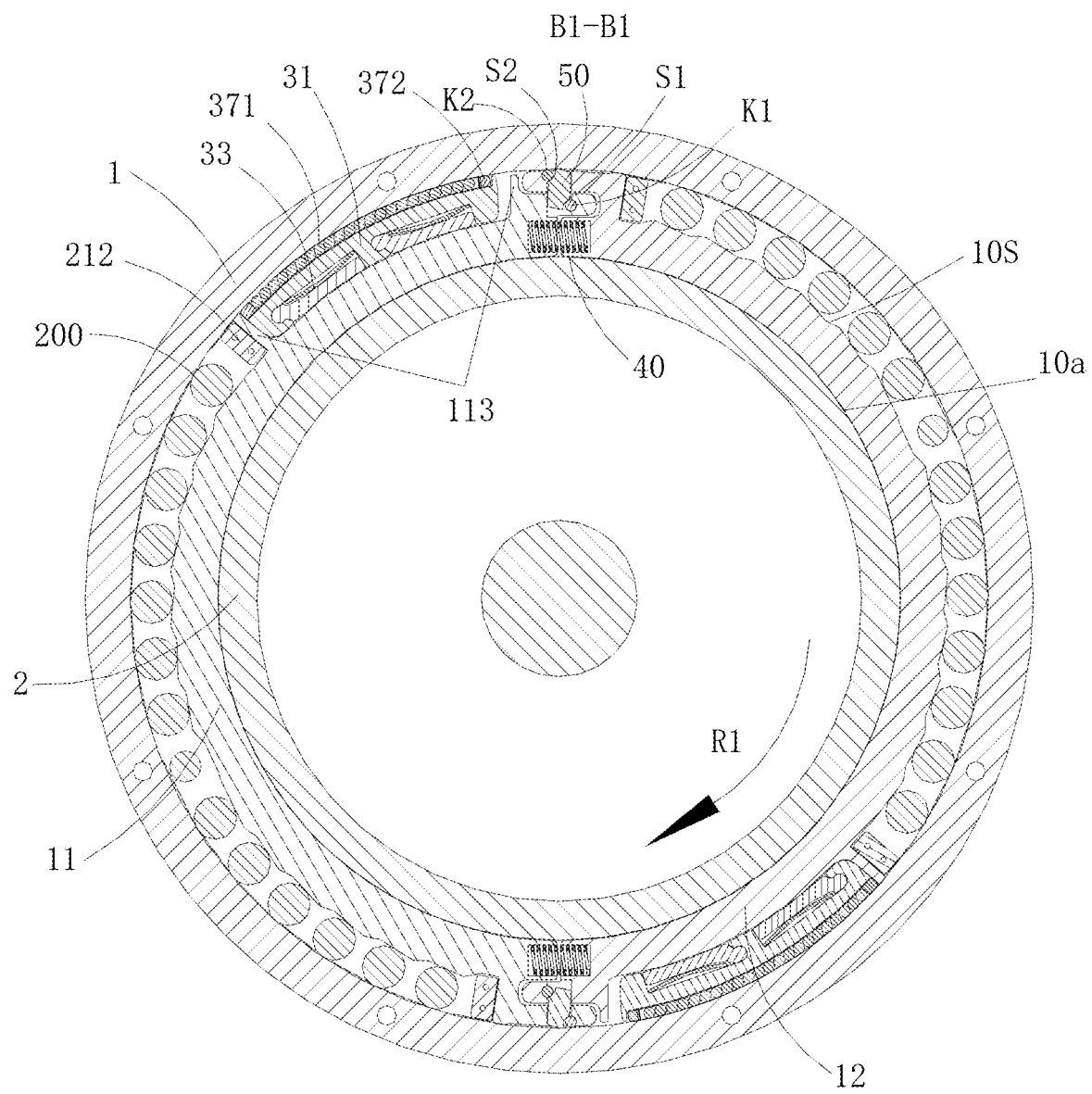
FIG. 6 is a section structural view taken from B1-B1 in FIG. 1.
Figure 7:
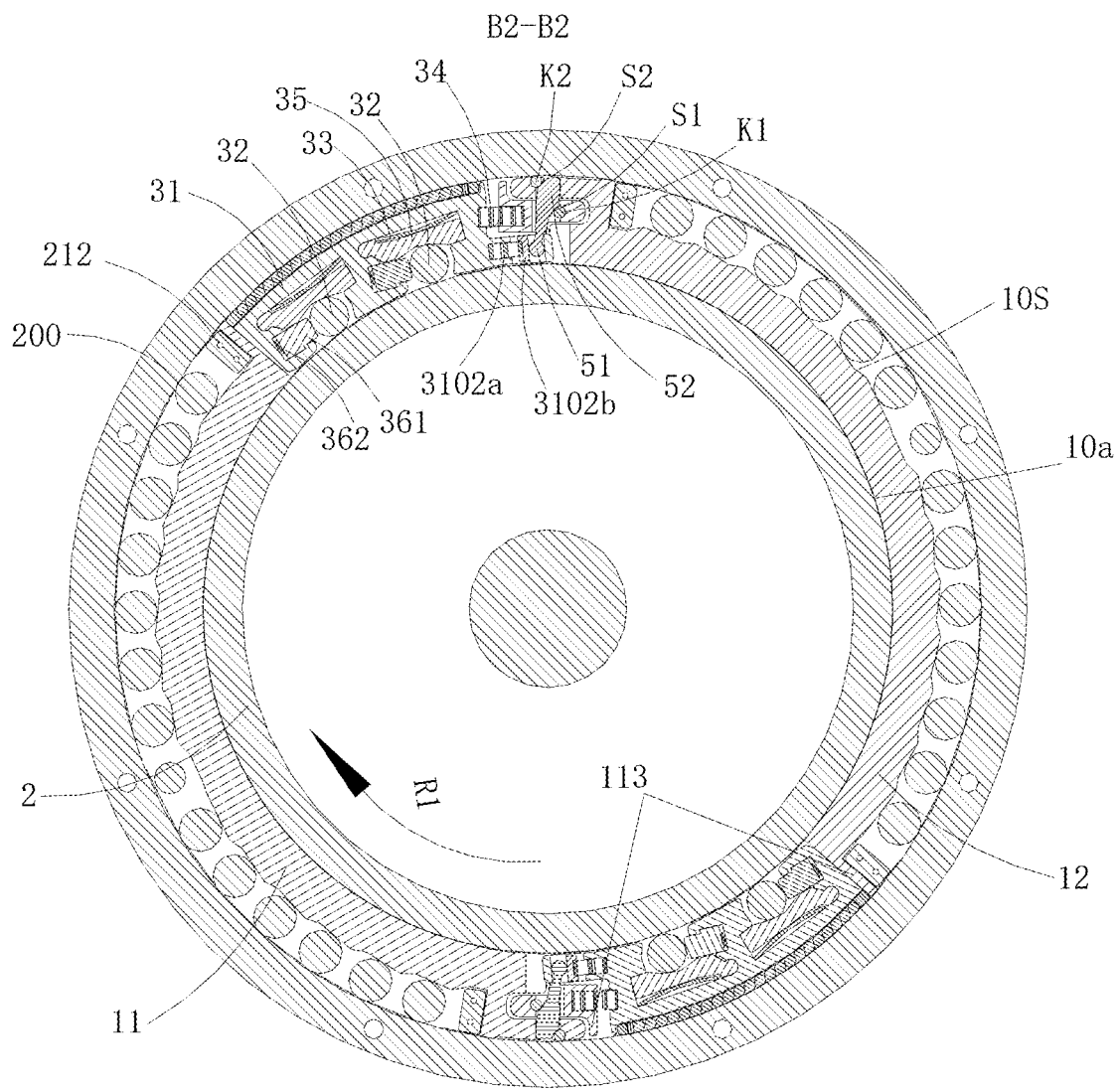
FIG. 7 is a section structural view taken from B2-B2 in FIG. 1.
Figure 8:
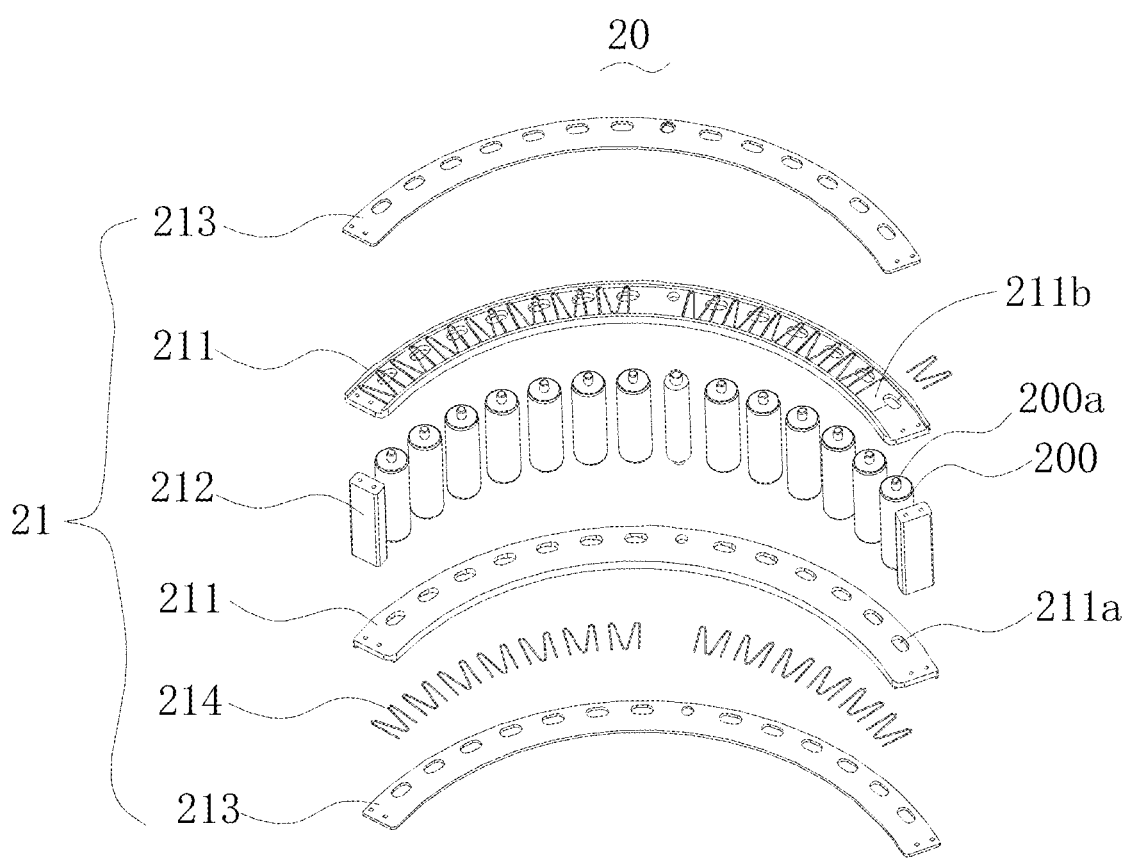
FIG. 8 is a structure decomposition view of the roller assembly of lower pair cambered-surface stop-block type overrunning clutch of Embodiment 1 of the present invention.

With reference to FIG. 6-8, the wedge assembly 20 of the present embodiment includes wedge blocks 200 and a holder 21 for holding the wedge blocks 200, wherein the holder 21 includes two parallel arc supporting plates 211, a spacing retaining element 212 provided between the two supporting plates 211, a cover plate 213 and a roller pre-loaded element 214; the spacing retaining element 212 can be various supporting structures of block-type, cylinder-type connected between the two parallel arc supporting plates 211 by fasteners. Each supporting plate 211 is provided with a plurality of spaced long holes 211a, the long holes 211a extending along the circumferential direction of the supporting plates 211, the heads 200a on both ends of rollers 200 penetrating through the long holes 211a and slidable along the length direction of the long holes 211a; the roller pre-loaded element 214 is an elastic element and one roller pre-loaded element 214 is disposed beside each of the heads 200a, one end of the roller pre-loaded element 214 being fixed with respect to the supporting plates 211 and another end elastically pushing the heads 200a, the cover plate 213 being provided to cover the supporting plates 211 and accommodating therein the roller pre-loaded element 214. The roller pre-loaded element 214 is an elastic tab structure with "M" shape and the supporting plates 211 are provided inside with a pre-loaded element accommodating slot 211b communicating with the long holes 211a; the roller pre-loaded element 214 is in a state of compression to snap into the pre-loaded element accommodating slot 211b with the free end thereof pushing elastically the heads 200a so that the roller 200 is in a pre-loaded state. Further, the roller pre-loaded element 214 pushed elastically the roller 200 towards the tail of the wedge assembly 20 so that the roller 200 can reset immediately after releasing from being wedged with the wedge surface 10S, thus increasing the sensibility of the clutch. The plurality of spacing retaining elements 212 are fixed to the ends and the middle of the holder 21 at intervals.

It can be understood that the roller pre-loaded element 214 is not limited to the "M"-shaped elastic tab structure, may also be an elastic element such as a compression spring; one end of the compression spring is fixed on the supporting plates 211 and another end pushes elastically the heads 200a so that the roller 200 is in pre-loaded state.

After the wedge assembly 20 is assembled, the wedge assembly 20 can be prevented from coming off the wedge assembly mounting part in the axial direction by fitting correspondingly the supporting plates 211 and the cover plate 213 on both sides into the step part 103 on both sides in the width direction of the friction block. The inner arc surface of the roller frame 21 is fitted into the step part 103 and the height of the outer arc surface of the roller frame 21 is lower than the roller 200. After the wedge assembly 20 is mounted between the friction blocks and the first rotating ring 1a, the roller 200 are clamped between the friction blocks and the first rotating ring 1a to receive the force. During the operation of the clutch, the roller frame 21 can only limit and pre-tight the roller 200 instead of being contacted with first rotating ring 1a.

Through the compact design for the roller frame 21, the roller 200 are ensured to arrange as closely as possible within the limited space of the overrunning clutch for dissipating the force experienced by a single roller 200 of the wedge blocks 20, thus improving the service life and torque load transmission performance of the wedge assembly 20; and, the roller pre-loaded element 214 is arranged to action on both ends of each roller 200, then the two cooperate to ensure the synchronous work performance of multiple rollers 200 and self-adjustment performance of wedge assembly 20, the plurality of wedge blocks 200 do not interfere with each other during operation; since the roller pre-loaded element 214 is disposed at both ends of the roller 200 instead of the middle, the roller 200 does not incline during wedging and jamming affects normal operation, resulting in higher reliability.

Figure 9:
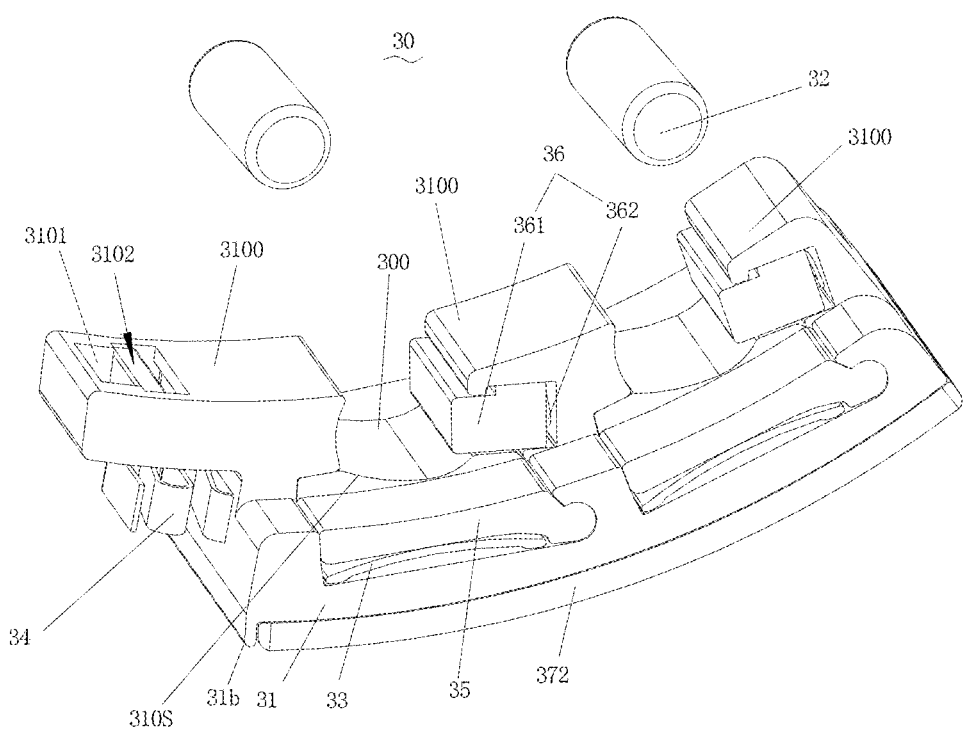
FIG. 9 is a structural view of the first propeller assembly of lower pair cambered-surface stop-block type overrunning clutch of Embodiment 1 of the present invention.
Figure 10:
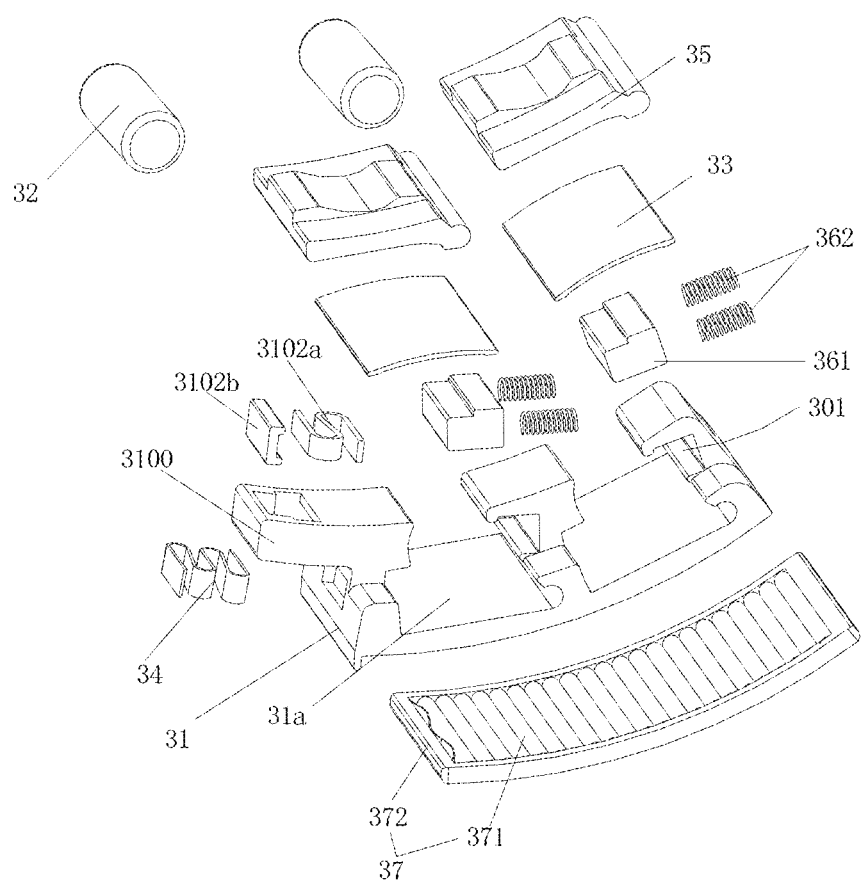
FIG. 10 is a structure decomposition view of the first propeller assembly of lower pair cambered-surface stop-block type overrunning clutch of Embodiment 1 of the present invention.

With reference to FIGS. 9 and 10, the first propeller assembly 30 includes a first fixed base 31, a first traction element 32, a second elastic element 33, a third elastic element 34, a first movable tab 35, a first pre-loaded assembly 36 and a first rolling needle assembly 37, wherein the first fixed base 31 is mounted onto the first propeller mounting part of the friction blocks by a plurality of first protruding blocks 3100 protruded from the bottom thereof; specifically, the first protruding block 3100 plugs into the first through hole 111 and can slide in the length direction of the first through hole 111 such that the synchronized push-block assembly 50 is selectively abutted.

In order to reduce the friction between the first propeller assembly 30 and the outer rotating element 1 and increase the radial load force and sliding sensitivity of the first propeller assembly 30, the outer surface of the first fixed base 31 is provided with a plurality of first rolling needles 371 arranged side by side, and the plurality of first rolling needles 371 is arranged side by side in a first rolling needle retaining frame 372 formed as a frame structure to prevent the first rolling needle 371 from misaligning or sloping, then the first rolling needle assembly 37 composed of above two is placed on the outer surface of the first fixed base 31 while the diameter of the first rolling needle 371 being larger than the thickness of the first rolling needle retaining frame 372, thus only the first rolling needle 371 is allowed to experience the radial pressure from the first rotating ring 1a and the first rolling needle retaining frame 372 only serves as a limit for the first rolling needle 371 while not experiencing any radial pressure. The first rolling needle 371 is placed in the first rolling needle retaining frame 372 instead of being fixed relative to the first rolling needle retaining frame 372 by mechanisms such as pin or shaft in order to avoid the reduction of service life for the first rolling needle retaining frame 372 due to radial pressure; when assembly, the first rolling needle 371 can be coated with lubricating oil prior to being placed in the first rolling needle retaining frame 372, thus, the first rolling needle 371 will not fall out of the first needle retaining frame 372. At the same time, the head of the first fixed base 31 is provided with a protruding limit stopper 31b for limiting the head of the first needle retaining frame 372 and the first needle retaining frame 372 is constrained to move between the first limit stopper 113 of each friction block near the tail and the limit stopper 31b of the first fixed base 31 so that the first rolling needle 371 is prevented from falling out of contacting with the first fixed base 31 during the rolling process.

The third elastic element 34 is provided at the head of the first propeller assembly 30 while the free end thereof abutting the first limit stopper 113 of the first propeller mounting part close to the head for urging elastically the first impeller assembly 30 in a direction away from the end surface of the head.

In other embodiments, the free end of the third elastic element 34 of the left friction block 11 can also abut elastically the tail of the right friction block 12 but the elastic force of the third elastic element 34 needs to be smaller than that of the first elastic element 40 so as to prevent the torque from being unable to transmit due to the situation that the two adjacent two friction blocks cannot always move closer together.

The first traction element 32 of the present embodiment is a rolling stick, and the bottom surface of the first fixed base 31 is provided with a first limit groove 31a for plugging into the first movable tab 35; the first movable tab 35 is plugged into this first limit groove 31a and the second elastic element 33 is compressed between the bottom surface of the first movable tab 35 and the first limit groove 31a to push against radially the first movable tab 35 towards the second rotating ring. The two adjacent first protruding blocks 3100 and the first movable tab 35 enclose a first groove 300 for accommodating the first traction element 32, wherein the two opposite surfaces of the two adjacent first protruding blocks 3100 serve as two sidewalls of the first groove 300 and the outer surface of the first movable tab 35 serve as the bottom surface of the first groove 300. The outer surface of the first movable tab 35 is provided with a first inclined surface 310S near the head of the first propeller assembly 30, and the closer to the head of the first propeller assembly 30, the smaller the distance from the first inclined surface 310S to the second rotating ring 2a. In other embodiments, the first traction element 32 may also be a wedge block.

The first inclined surface 310S may be an arc surface of a slope face. When the inner rotating element 2 is rotated in the clockwise direction (R1 direction in the figure) shown in FIG. 6, the first traction element 32 elastically contact the outer surface of the first movable tab 35 and the second rotating ring 2a under the radial pressure of the second elastic element 33 while the first traction element 32 rolling in the counter-clockwise direction along the first inclined surface 310S when driven by the tangential friction of the second rotating ring 2a; then since the shape configuration of the first inclined surface 310S, the amount of compression of the second elastic element 33 is getting larger and larger, and when the first traction element 32 rolls to contact the side wall of the head of first groove 300, the second elastic element 33 has the largest amount of compression; the first traction member 32 stops rotating under the multiple action of the radial pressure of the second elastic element 33, the frictional force of the sidewall of the first groove 300, the frictional force of the first inclined surface 310S and the frictional force of the second rotating ring 2a so as to comes into contact with the second rotating ring 2a and being relatively stationary; the inner rotating element 2 then drives the entire first thruster assembly 30 to rotate in the clockwise direction on the first propeller mounting part.

Further, one end of the first movable tab 35 is provided on the first fixed base 31 rotatably, another end can rotate relative to the first fixed base 31 and abut elastically against the inner wall of the first limit groove 31a under the action of the second elastic element 33.

Further, the first propeller assembly 30 is provided with a first pre-loaded assembly 36 on a side of the first groove 300 far away from the first inclined surface 310S for elastically pushing the first traction element 32 towards the first inclined surface 310S so that the traction member 32 can be always in a pre-tensioned state. Specifically, the first fixed base 31 defines a first slot 301 therein; the first pre-loaded assembly 36 includes a first pre-loaded pressure plate 361 and at least one first pre-loaded elastic element 362. The first pre-loaded elastic element 362 is provided in the first slot 301 and presses against the first pre-loaded pressure plate 361 to make the first pre-loaded pressure plate 361 snap into and protrude from the first slot 301. The first pre-loaded elastic element 362 may be one or more of elastic tabs, springs, rubber columns or the combinations thereof.

The head of the first propeller assembly 30 is a push-block pushing part 3101. Since overrunning clutches are heavily loaded in certain heavy-loaded situations, the push-block pushing part 3101 is provided with a spring decompression assembly 3102 contacting the synchronized push-block assembly 50 in order to prevent the first propeller assembly 30 and the synchronized push-block assembly 50 from be damaged due to the first propeller assembly 30 direct and rigid contacting with the synchronized push-block assembly 50; the pushing force of the synchronized push-block assembly 50 can be adjusted as needed to ensure the synchronous working state of the friction block assembly 10 and effectively prolong the service life of the products. As the spring decompression assembly 3102 has a certain rigidity, the spring decompression assembly 3102 does not deform when the force between the spring decompression assembly 3102 and the synchronized push-block assembly 50 is relatively small and when the force between the spring decompression assembly 3102 and the synchronized push-block assembly 50 increases to a certain magnitude, the spring decompression assembly 3102 is compressed to deform. Specifically, the push-block pushing part 3101 is a through hole which is arranged on the first protruding block 3100, and the lower end of the synchronized push-block assembly 50 passes through the through hole; the spring decompression assembly 3102 comprises a first bumper 3102a, here, the first bumper 3102a is an elastic tab fixed in the through-hole; and a bumper pressure plate 3102b for facilitating contact with the synchronized push-block assembly 50 may be further disposed at the end of the first bumper 3102a.

With combination of FIGS. 6 and 7, in the initial state, there is a certain distance between the head end face of the first propeller assembly 30 and the first limit stopper 113 of the first propeller mounting part. During the process of the first propeller assembly 30 rotating clockwise in high-speed relative to the first propeller mounting part, the synchronized push-block assembly 50 is driven to swing by the spring decompression assembly 3102 contacting the synchronized push-block assembly 50 for drawing the left and right friction blocks 11, 12. When the synchronized push-block assembly 50 swings to a certain position and cannot continue swinging, the synchronized push-block assembly 50 is pushed into position, and the closed structure formed by the left friction block 11 and the right friction block 12 rotates synchronously with the synchronized push-block assembly 50; at this time, the left friction block 11 and the right friction block 12 are loosely fitted with the second rotary ring 2a, and the first propeller assembly 30 continues to rotate following the second rotating ring 2a to compress the first bumper 3102a until the pushing force suddenly increases to a maximum after its head collides with the first limit stopper 113 of the head of the first propeller mounting part so that the friction block assembly 10 composed of the left friction block 11 and the right friction block 12 is pushed to generate a reverse rotation tendency with the outer rotating element 1; thus, the roller 200 rolls counter-wise to wedge with the raised part 102 of the wedge surface 10S for generating radial pushing force against the friction block assembly 10 so that the ring shape composed of the friction block assembly 10 completely locks the second rotating ring 2a through the cambered-surface stop surface 10a, then the friction block assembly 10 can rotate synchronously with the inner rotating element 2 and the clutch is coupled to begin to transmit torque.

Since the third elastic element 34 is arranged on the head of the first propeller assembly 30, it can function as a cushion to prevent the two elements from being rigidly contacted with each other. Meanwhile, during the reverse rotation of the inner rotating element 2, the third elastic member 34 can also function as resetting the first propeller assembly 30 for the next action, thus greatly improving the reaction sensitivity of the overrunning clutch.

Figure 11:
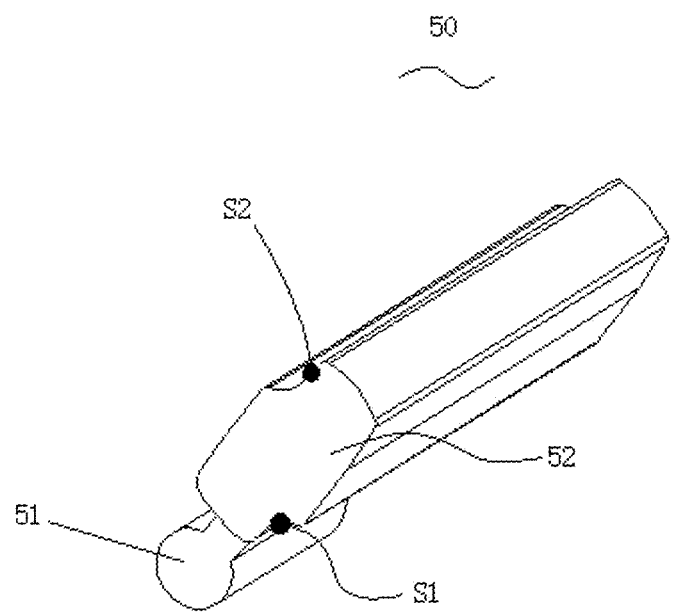
FIG. 11 is a structural view of the synchronized push-block assembly of lower pair cambered-surface stop-block type overrunning clutch of Embodiment 1 of the present invention.

As shown in FIGS. 7 and 11, the synchronized push-block assembly 50 is substantially strip-shaped and comprises a push arm 51 for the first propeller assembly 30 to push and a block body 52 for driving the adjacent two friction blocks to become close to each other under the push of the first propeller assembly 30. Specifically, the block body 52 is wider than the push arm 51, and the block body 52 plugs into the first insert hole 100a of the head of the left friction block 11 and the second insert hole 100b of the tail of the adjacent right friction block 12 to make the push arm 51 position in the through hole of the push-block pushing part 3101. When the push-block pushing part 3101 pushes the push art 51 to rotate in the clockwise direction, the block body 52 has a trend of moving in the counter-clockwise direction, as shown in FIGS. 6 and 7. Then according to leverage principle, the second cooperating part S2 on the upper left side of the block body 52 presses the side wall of the second insert hole 100b close to the end surface of the tail and the first cooperating part S1 on the lower right side of the block body 52 presses the first insert hole 100a towards the side wall of the head end surface such that the amount of overlap of the left friction block 11 and the right friction block 12 gradually increases and the gap between the two and the inner rotating element 2 becomes smaller and smaller. After the synchronized push-block assembly 50 is pushed into place, the closed structure formed by the left friction block 11 and the right friction block 12 rotates synchronously with the synchronized push-block assembly 50.

In order to prevent the synchronized push-block assembly 50 from being stuck after being pushed into place and prevent the synchronized push-block assembly 50 from being unable to reset after removing the pushing force from the first propeller assembly 30, the side wall of the first insert hole 100a close to the head end surface and the side wall of the second insert hole 100b close to the tail end surface are movably inserted with stick bodies K1 and K2 of the needle structure and the first cooperating part S1 and the second cooperating part S2 of the block body 52 and are correspondingly concave arc surfaces, and the first cooperating part S1 and the second cooperating part S2 are in rolling contact with the stick bodies K1 and K2. Thus, after the push force from the first propeller assembly 30 is removed, the first elastic element 40 urges two adjacent friction blocks to separate and the stick bodies K1, K2 roll relative to the first cooperating part S1 and second cooperating part S2, then the synchronized push-block assembly 50 can be automatically reset without jamming and self-locking phenomenon, and the method of rolling cooperation can also greatly reduce the wear of the components.

In other embodiments, stick bodies K1, K2 may also be modified as protruding arc structures, and the radius of the concave arc surface of the first cooperating part S1 and the second cooperating part S2 is set to be larger than the radius of the convex arc surface structure with which they are cooperated, then the first cooperating part S1 can be rotated relative to the convex arc surface structure and reset.

Further, the first propeller assembly 30 may be provided with a plurality of first grooves 300 of the same structure. Each of the first grooves 300 defines a first traction element 32 and other corresponding structures cooperating with the first traction element 32. Further, the first propeller assembly 30 of the present embodiment has two first grooves 300 disposed adjacent to each other in a length direction thereof. Each of the first grooves 300 is enclosed by two first protruding blocks 3100 and one first movable tab 35. Compared with the solution of setting one first traction element 32, the two first traction elements 32 have more contact points with the second rotating ring 2a, and the first propeller assembly 30 is wedged with the second rotating ring 2a wedge more reliably.

Specifically, during assembly, one end of the first elastic element 40 is fixed to the corresponding end of the friction block, and the first propeller assembly 30 is mounted to the first propeller mounting part; the left and right friction blocks 11, 12 form a circular structure by lapping end to end to enclose around the outer surface of the second rotating ring 2a of the inner rotating element 2, then the push arm 51 of the synchronized push-block assembly 50 is inserted into the through hole of the push-block pushing part 3101 of the first propeller assembly 30 through the first insert hole 100a and the second insert hole 100b successively; the block body 52 of the synchronized push-block assembly 50 is snapped into the first insert hole 100a and the second insert hole 100b so that the left and right friction blocks 11, 12 can be prevented from separating due to the pressure from the first elastic element 40 for pre-assembly; then the wedge assembly 20 is mounted onto the wedge assembly mounting part; finally, the left and right friction blocks 11, 12 are pushed towards the middle to compress the first elastic element 40, and after placing assembled left friction block 11, right friction block 12, first propeller assembly 30, first elastic element 40, synchronized push-block assembly 50 and inner rotating element 2 altogether into the outer rotating element 1, the left friction block 11, the right friction block 12, the first propeller assembly 30, the first elastic element 40, the synchronized push-block assembly 50 and the inner rotating element 2 can be fully installed in place by turning the inner rotating element 2 clockwise; in the end, the overrunning clutch assembly can be assembled completely by fixing the clutch cover plate 4 the end surface of the outer rotating element 1 through the threaded fastener.

Specifically, when installing the first propeller assembly 30, the second elastic element 33, the third elastic element 34, the first movable tab 35 and the first pre-loaded assembly 36 are assembled to the first fixed base 31, and then the assembled structure is inserted into the first through hole 111 of the friction block through the first protruding block 3100 at the bottom of the first fixed base 31 and the first traction element 32 is placed in the first groove 300; after the first propeller assembly 30 and the friction block assembly 10 are placed on the outer surface of the second rotating ring 2a of the inner rotating element 2, the first traction element 32 is limited by the inner rotating element 2 and does not come out.

When the first propeller assembly 30 is in the first limit part, the first elastic element 40 has the largest amount of compression and the annular inner diameter of the friction block assembly 10 is the smallest, the first traction element 32, the friction block assembly 10 and the second rotating ring 2a snapping tightly and rotating synchronously; when the first propeller assembly 30 is in the second limit part, the elastic element 40 has the minimum amount of compression, the friction block assembly 10 is composed of the largest annular inner diameter, the first traction element 32, the friction block assembly 10 are in loose gap fit with the second rotating ring 2a and out of synchronization.

During operation, the overrunning clutch of the present embodiment has two motion states of separation and combination. When it is not necessary to transmit the torque, the overrunning clutch is in a disengaged state and the inner rotating element 2 rotates counter-clockwise relative to the outer rotating element 1, specifically, the first pre-loaded assembly 36 always presses elastically the first traction element 32 to make it in a pre-loaded state; during the counter-clockwise rotation of the inner rotating element 2, the first traction element 32 is in rolling contact with the second rotating ring 2a of the inner rotating element 2 while the diameters of the left and right friction blocks 11, 12 becoming larger than the second rotating ring 2a under the elastic push from the first elastic element 40 so as to be stationary relative to the outer rotating element 1; when torque transmission is required, the rotation direction of the inner rotating element 2 relative to the outer rotating element 1 abruptly changes to be the clockwise direction R1, then the first traction element 32 rolls in contact with the second rotation ring 2a of the inner rotating element 2, and the second rotating ring 2a drives the first traction element 32 to move in the clockwise direction R1 relative to the surface of the first movable tab 35 to draw the first traction element into the first inclined surface 310S of the first groove 300; since the closer to the head of the first propeller assembly 30, the smaller the distance from the first inclined surface 310S to the second rotating ring 2a, the amount of compression of the second elastic element 33 and the radial pressure of the second elastic element 33 against the first traction element 32 are getting larger and larger in above process; when the first traction element 32 rolls to contact the side wall of the head of first groove 300, the second elastic element 33 has the largest amount of compression; the first traction member 32 stops rotating under the multiple action of the radial pressure of the second elastic element 33, the frictional force of the sidewall of the first groove 300, the frictional force of the first inclined surface 310S and the frictional force of the second rotating ring 2a so as to comes into contact with the second rotating ring 2a and being relatively stationary; the second rotating ring 2a then drives the entire first propeller assembly 30 to rotate in the clockwise direction on the first propeller mounting part, at this point, the spring decompression assembly 3102 at the head of the first propeller assembly 30 presses the push arm 51 of the synchronized push-block assembly 50 to swing the block body 52 for drawing the two adjacent friction blocks; when the synchronized push-block assembly 50 swings to a certain position and cannot continue swinging, the synchronized push-block assembly 50 is pushed into position, and the closed structure formed by the left friction block 11 and the right friction block 12 rotates synchronously with the synchronized push-block assembly 50; at this time, the cambered-surface stop surface 10a of the left friction block 11 and the right friction block 12 are loosely fitted with the second rotary ring 2a, and the first propeller assembly 30 continues to rotate following the second rotating ring 2a to compress the first bumper 3102a until the pushing force suddenly increases to a maximum after its head collides with the first limit stopper 113 of the head of the first propeller mounting part so that the friction block assembly 10 composed of the left friction block 11 and the right friction block 12 is pushed to generate a reverse rotation tendency with the outer rotating element 1 to roll the roller 200 counterclockwise to wedge with the raised part 102 of the wedge surface 10S for generating a radial pressing force against the friction block assembly 10 and the annular arc radius inside the friction block assembly 10 further reduces to completely lock the second rotating ring 2a through the cambered-surface stop surface 10a to truly achieve lower-pair stop; thus, the first rotating ring 1a and the outer surface of the friction block assembly 10 are wedged by the roller 200 rolling in cooperation with the wedge surface 10S, and the inner arc surface of the second rotating ring 2a and the friction block assembly 10 cooperate with the cambered-surface stop surface 10a to achieve the cambered-surface stop, to achieve synchronous rotation of the outer rotating element 1, the friction block assembly 10 and the inner rotating element 2, further achieve the transmission of torque; when no torque needs to be transmitted, the inner rotating element 2 is further rotated counterclockwise to drive the first traction element 32, the friction block assembly 10 to rotate counterclockwise relative to the outer rotating element 1; since the friction block assembly 10 is de-wedged from the outer rotating element 1 and the friction block assembly 10 from the first traction element 32 simultaneously, the thrust force exerted on the synchronized push-block assembly 50 by the first propeller assembly 30 is withdrawn immediately while the third elastic element 34 restoring to deform for resetting the first propeller assembly 30 and the first elastic element 40 restoring to deform so that the friction block assembly 10 is distracted again to disengage from being stuck with the inner rotating element 2; then the first traction element 32 rolls in contact with the second rotating ring 2a of the inner rotating element 2, the inner rotating element 2 idles, and hence the clutch enters an overrunning state in which no torque is transmitted. In the overrunning state, the inner rotating element 2 is in a non-contact state with the friction block assembly 10, omitting most of the idle resistance of the inner rotating element 2, so that the overrunning clutch of the embodiment of the present invention can be very well applied to the high-speed and heavily-loaded workplace, and there will not occur heating phenomenon in these workplaces.

Further, in this embodiment, the first elastic element 40 is a spring, the second elastic element 33 is an arched steel sheet, and the third elastic element 34 is an elastic tab bent a plurality of times and the roller pre-loaded element 214 is an "M"-shaped elastic tab structure. It can be understood that these elastic elements may also be other structures with the same function.

The inner arc surface of the friction assembly in the present embodiment is a cambered-surface stop surface and the outer surface is provided with a roller wedge surface, thus the transmission of torque can be achieved and the capacity of withstanding torque of the overrunning clutch can be maximally improved by the friction block assembly conducting lower-pair cambered-surface stop with the drive element and wedging to lock tightly with the driven element, thereby being able to be applied in a variety of working occasions of high-speed, large torque and strong impact. Compared with prior art, the overrunning clutch of the present invention has a more sensitive reaction, better wear resistance performance, ultra-long service life, and serious heat phenomenon will not occur even after a long-time, high-intensity operation.

Embodiment 2

Figure 12:
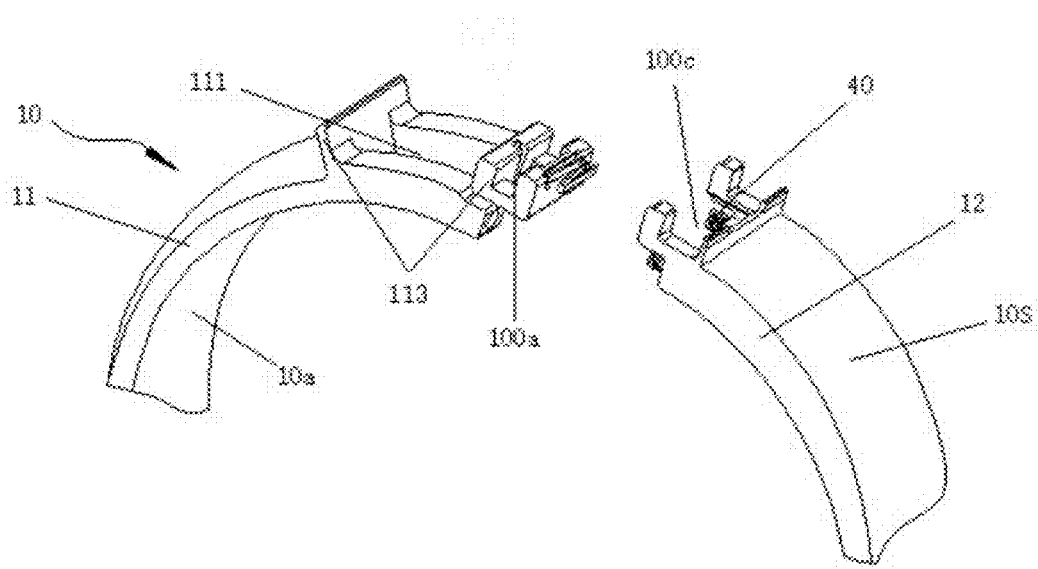
FIG. 12 is a partial structural view of friction block assembly of Embodiment 2 of the present invention.
Figure 13:
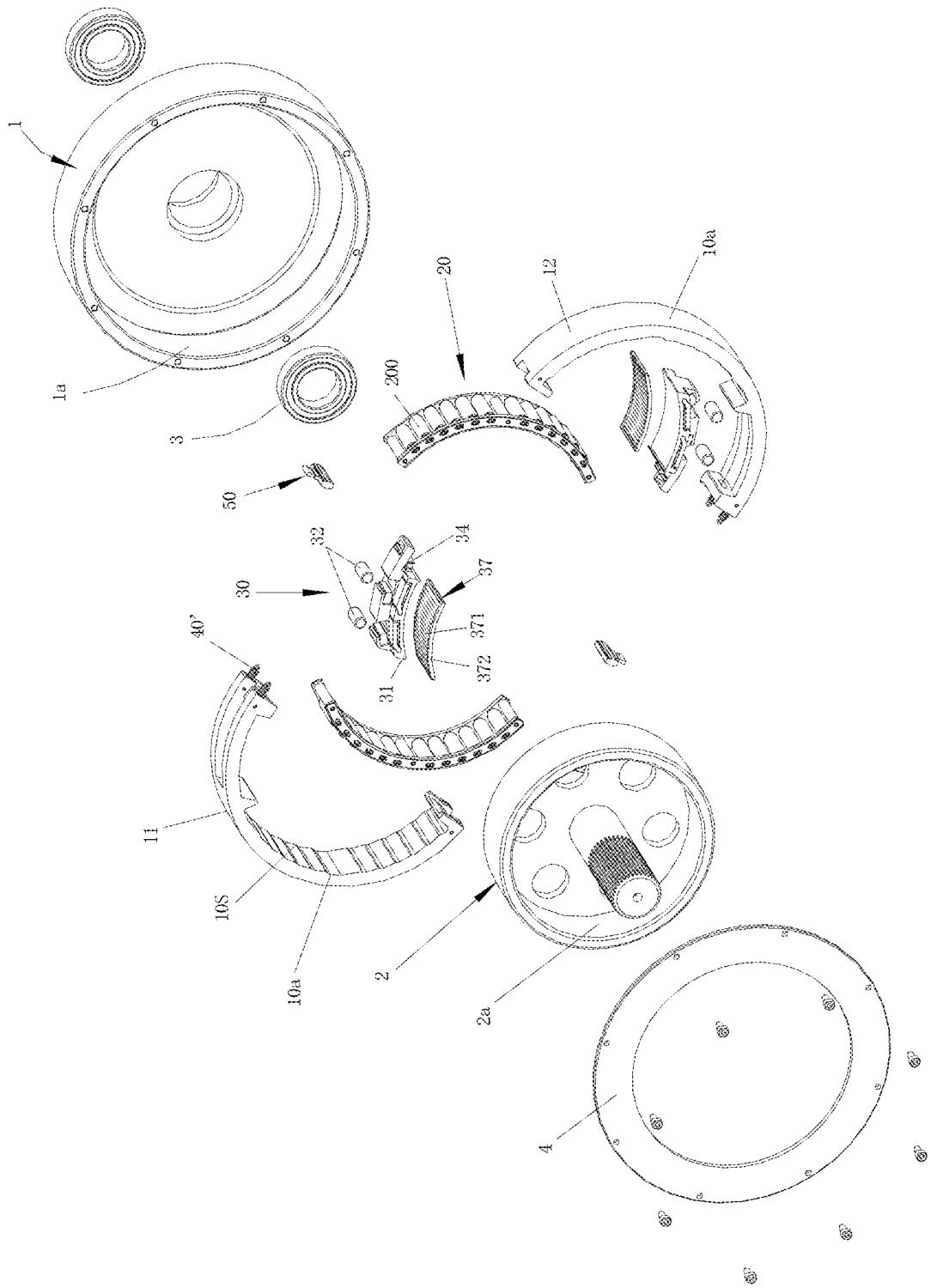
FIG. 13 is a structure decomposition view of lower pair cambered-surface stop-block type overrunning clutch of Embodiment 3 of the present invention.
Figure 14:
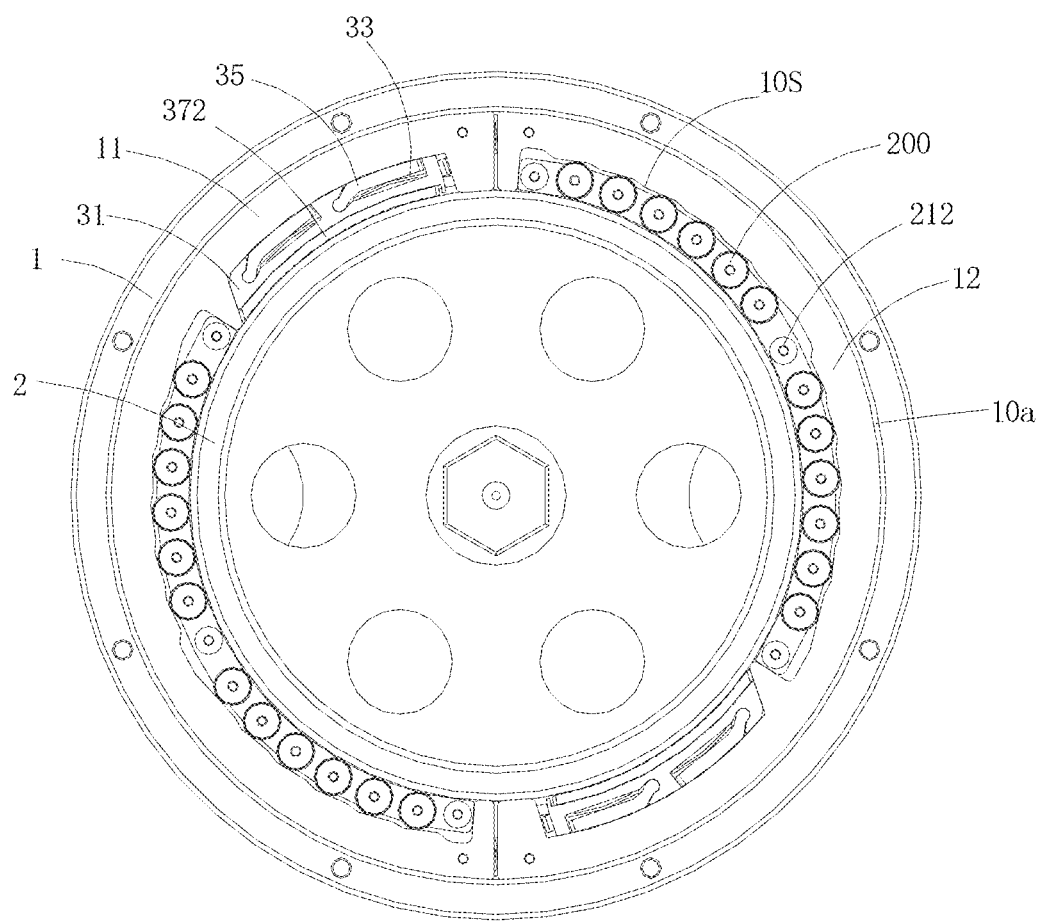
FIG. 14 is a partial structural view of lower pair cambered-surface stop-block type overrunning clutch of Embodiment 3 of the present invention.

As shown in FIG. 12, different from Embodiment 1, the first lapping part and second lapping part at the end surfaces of the head and tail of each friction block are another structures different from Embodiment 1, specifically, both the first lapping part and second lapping part are configured to be an anti-hook structure extending from the end surfaces of friction blocks and folding outward while forming a first insert hole 100a at the first lapping part and a notch 100c at the second lapping part; during assembly, the first lapping part is inserted in to the notch 100c of the second lapping part, then the synchronized push-block assembly 50 is inserted into the first insert hole 100a and the notch 100c to keep the synchronized push-block assembly 50 snap between the two hook bodies. The first propeller assembly 30 pushed the push arm 51 to urge the block body 52 and rolling needles 53 to press the second and first lapping part respectively for keeping the two close to each other, then the wedge assembly 20 is cooperated with the first rotating ring 1a and the wedge surface 10S of the wedge block assembly 10 for rolling-wedge, thereby the cambered-surface stop surface 10a of the inner surface of the wedge block assembly 10 clamping the second rotating ring 2a of the inner rotating element 2 to achieve lower-pair stop.

Embodiment 3

As shown in FIG. 13-19, the difference between above embodiment and the present embodiment mainly lies in the arrangement of the roller wedge surface 10S and cambered-surface stop surface 10a of the friction block assembly 10. The inner arc surface of the present embodiment is provided with the roller wedge surface 10S and the outer surface is the cambered-surface stop surface 10a. The friction block assembly 10 is arranged between the first rotating ring 1a and the second rotating ring 2a, and the first elastic element 40' is a tension spring with both ends fixed on the end surfaces of two adjacent friction blocks respectively for drawing the two adjacent friction blocks, specifically, the end surface of each friction block is provided with a through hole (not shown) for accommodating the tension spring and a fixed column (not shown) is provided in the through hole for the free end of the tension spring to hook; when in natural state, the tension spring draws two adjacent friction blocks and completely accommodate in the through hole; the synchronized push-block assembly 50 is mounted between the end surfaces of two adjacent friction blocks, and the left and right friction blocks 11, 12 are plugged movably with stick bodies K2', K1' with the structure of rolling needle for rolling contact with the second cooperating part S2 and the first cooperating part S1. Two adjacent friction blocks are separated by the first propeller assembly 30 overcoming the pulling force from the first elastic element 40 when pushing the synchronized push-block assembly 50 so that the outer diameter of the circular structure formed by the friction block assembly 10 becomes larger to realize the synchronous workability of the friction block assembly 10.

Figure 15:
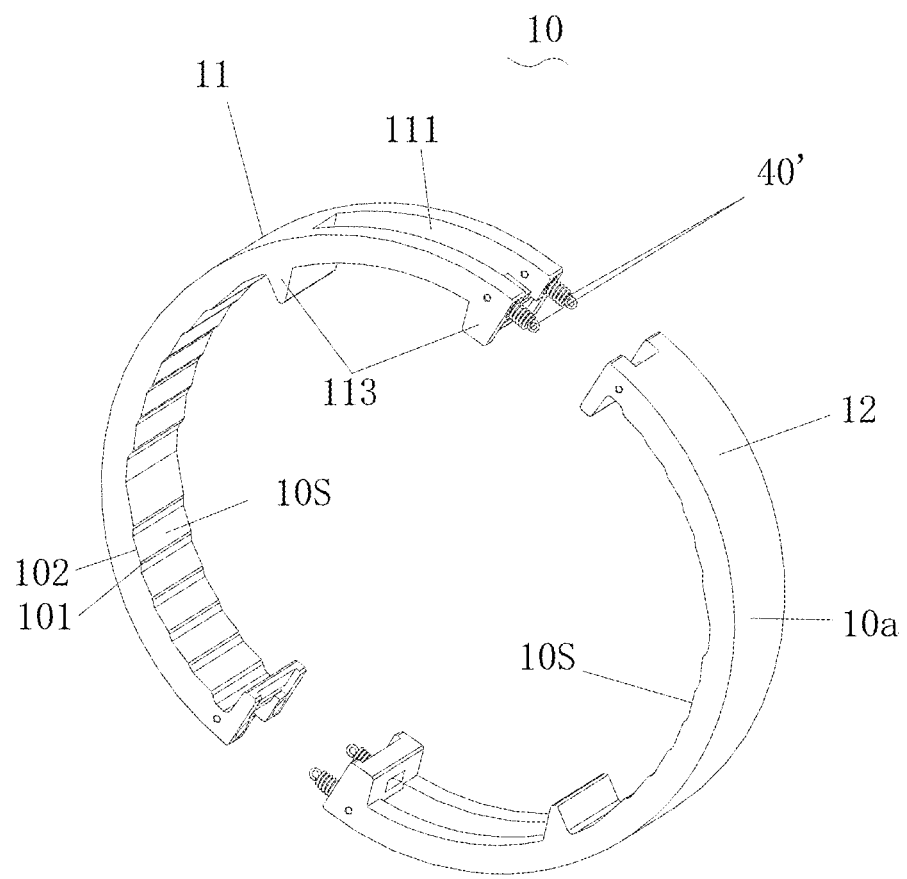
FIG. 15 is a structural view of the friction block assembly of lower pair cambered-surface stop-block type overrunning clutch of Embodiment 3 of the present invention.
Figure 16:
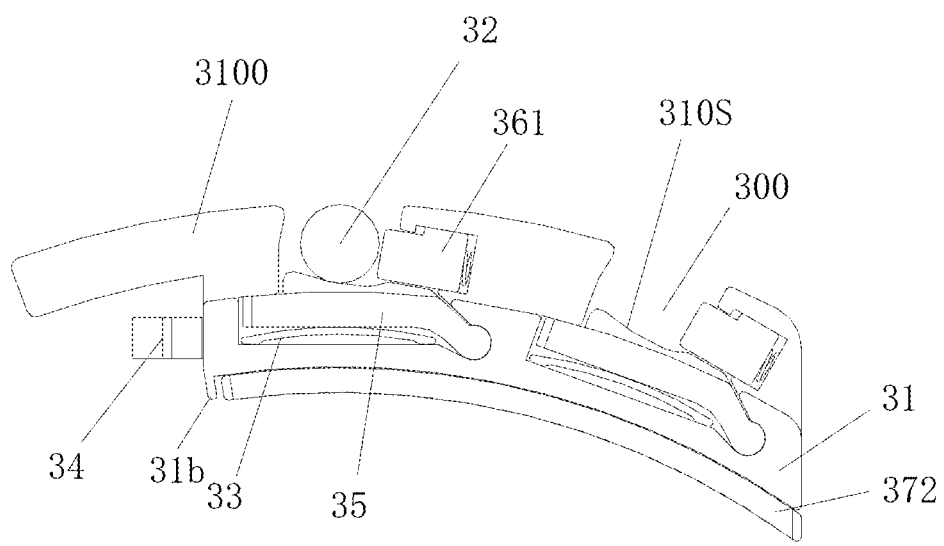
FIG. 16 is a structural view of the first propeller assembly of lower pair cambered-surface stop-block type overrunning clutch of Embodiment 3 of the present invention.
Figure 17:
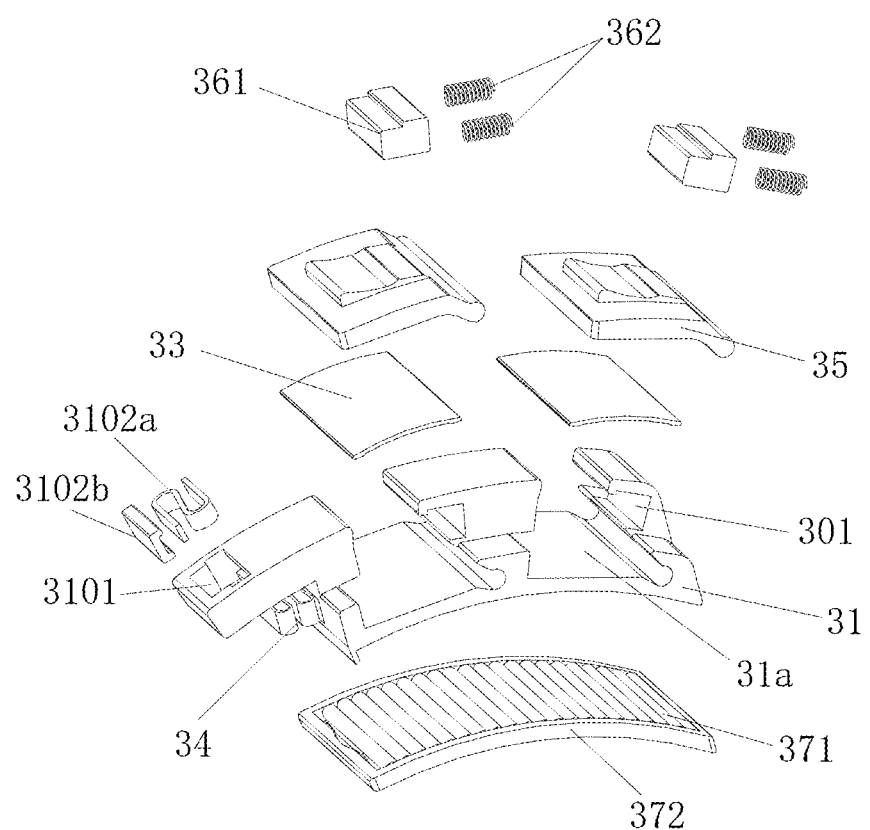
FIG. 17 is a structure decomposition view of the first propeller assembly of lower pair cambered-surface stop-block type overrunning clutch of Embodiment 3 of the present invention.

Correspondingly, the structure of the friction block assembly 10 changes partially, as shown in FIG. 15, the first propeller mounting part, wedge assembly mounting part, wedge surface 10S and the first limit stopper 113 are all modified to be arranged on the inner surface of each friction block; and the shape of the first propeller assembly 30 is changed partially, as shown in FIG. 16-19, the first groove 300 for accommodating the first traction element 32 is provided on the top of the first fixed base 31, and the first rolling needle assembly 37 is provided at the bottom of the first fixed base 31, the first traction element 32 being in cooperating contact with the first rotating ring 1a and the first rolling needle assembly 37 with the second rotating ring 2a.

Other structures of the present invention are similar to above embodiments, and details are not described herein again. The working principle of the present embodiment will be described below.

Figure 18:
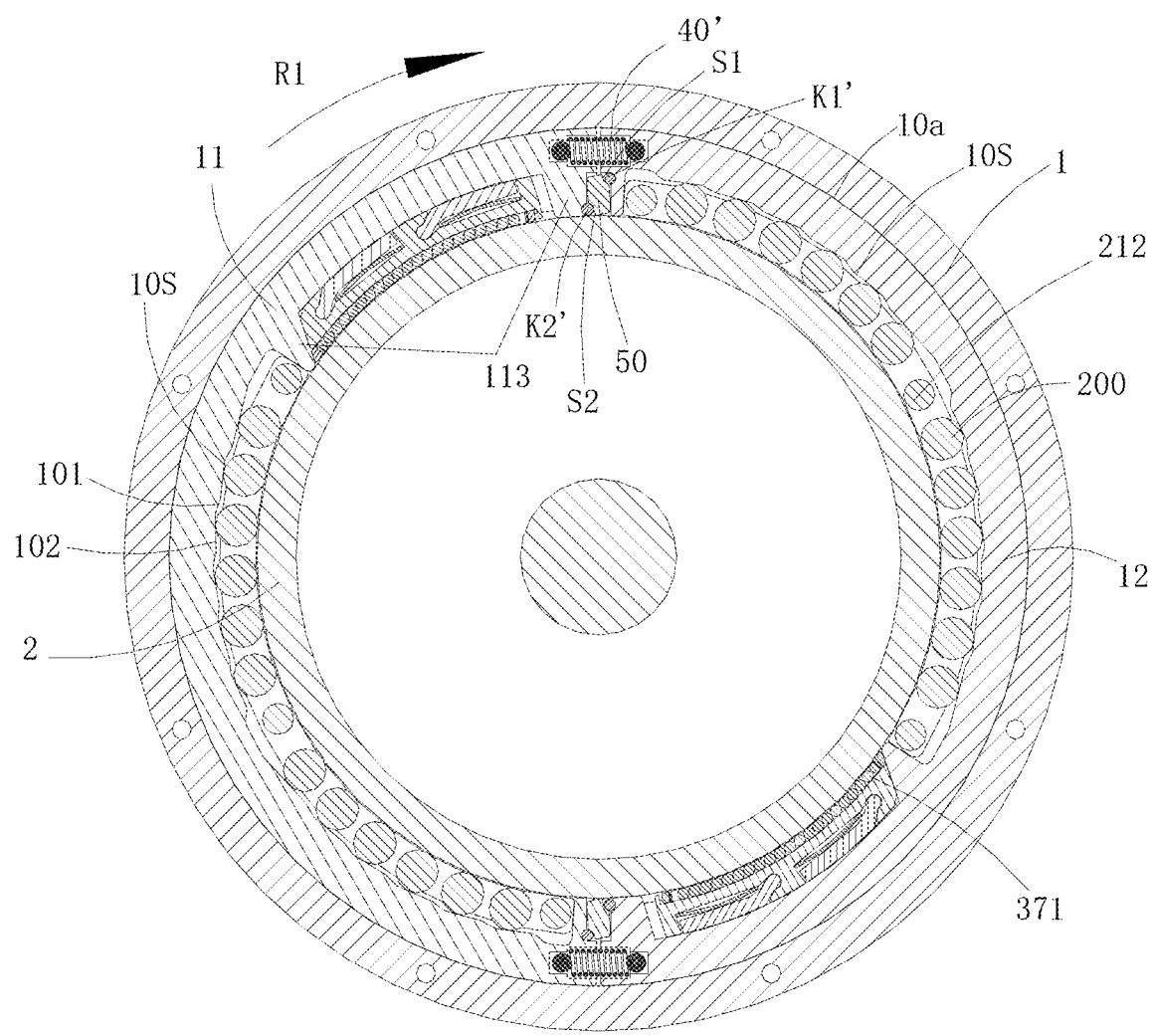
FIG. 18 is a section structural view of lower pair cambered-surface stop-block type overrunning clutch of Embodiment 3 of the present invention.
Figure 19:
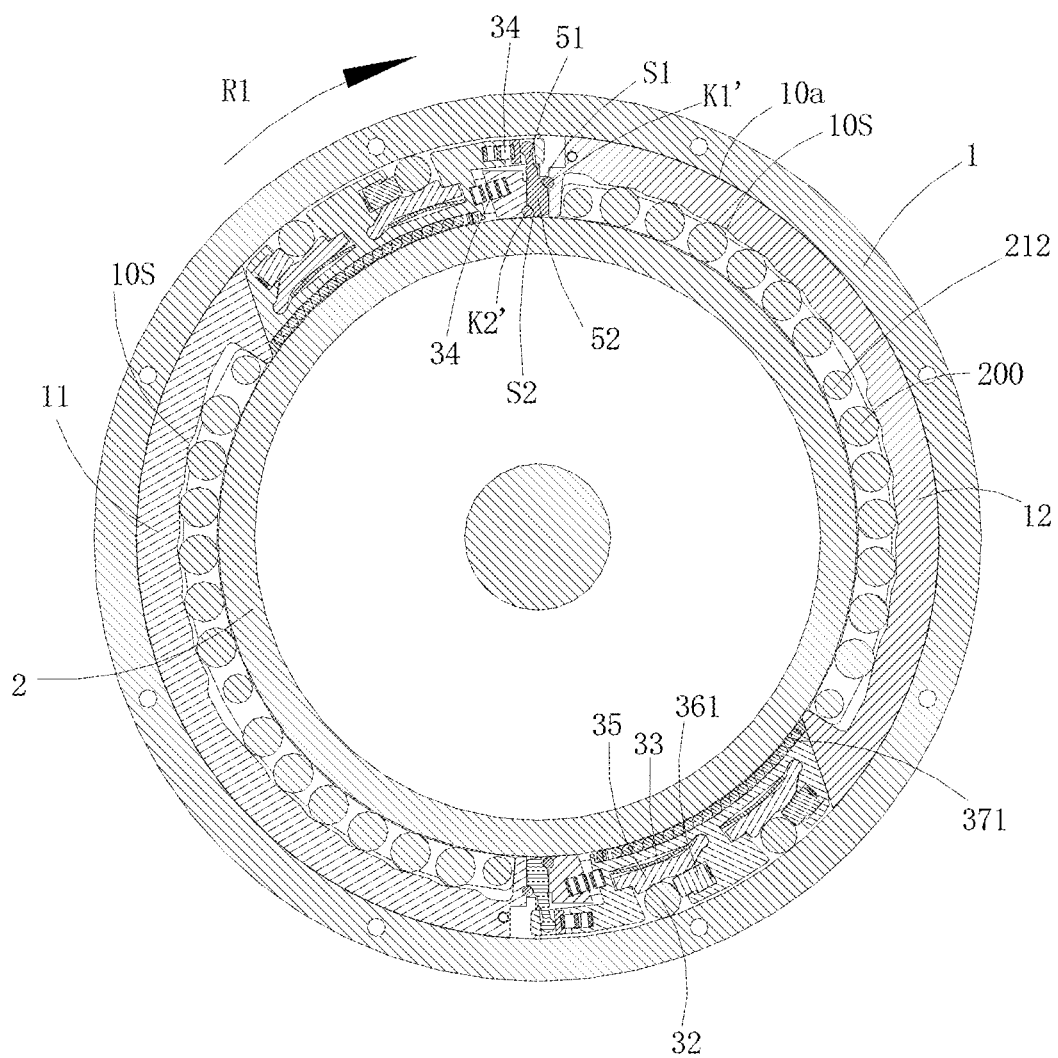
FIG. 19 is another section structural view of lower pair cambered-surface stop-block type overrunning clutch of Embodiment 3 of the present invention.

As shown in FIGS. 18 and 19, when the torque is needed to transmit, the outer rotating element 1 will rotate relative to the inner rotating element 2 along the R1 clockwise direction. The friction block assembly 10 of the present embodiment drags the first traction element 32 to move along the first inclined surface 310S through the friction between the first traction element 32 and the first rotating ring 1a; when the first traction element 32 moves to a position where the first rotating ring 1a is wedged tightly with the first inclined surface 310S, the first rotating ring 1a continues rotating to drive the first propeller assembly 30 to slide on the friction block assembly 10 so that the first propeller assembly 30 is driven to push the synchronized push-block assembly 50; then the synchronized push-block assembly 50 swings to force the outer diameter of the ring shape composed of the friction block assembly 10 to become larger gradually until the propelling force suddenly increases to a maximum after the head of the propeller assembly 30 collides and abuts with the first limit stopper 113 of the friction block so that the friction block assembly 10 composed of the left friction block 11 and the right friction block 12 is pushed to generate a reverse rotation tendency with respect to the inner rotating element 2 to roll the roller 200 clockwise to wedge with the raised part 102 the wedge surface 10S so as to generate a radial pressing force against the friction block assembly 10, subsequently, the outer diameter of the ring shape composed of the friction block assembly 10 further increases to completely lock the first rotating ring 1a through the cambered-surface stop surface 10a; thus the cambered-surface stop surface 10a on the outer surface of the friction block assembly 10 and the first traction element 32 abuts against the first rotating ring 1a to achieve lower-pair cambered-surface stop, and the second rotating ring 2a is wedged with the inner surface the friction block assembly 10 by rollers, then at this point, the outer rotating element 1, friction block assembly 10 and the inner rotating element 2 rotate synchronously and transmission of torque can be achieved; when it is not necessary to transmit the torque, the outer rotating element 1 reverses counter-clockwise, the thrust force exerted on the synchronized push-block assembly 50 by the first propeller assembly 30 is withdrawn immediately while the third elastic element 34 restoring to deform for resetting the first propeller assembly 30 and the first elastic element 40' restoring to deform so that the radius of the ring shape composed of the friction block assembly 10 is reduced to disengage from being stuck with the outer rotating element 1; then the first traction element 32 rolls in contact with the first rotating ring 1a of the outer rotating element 1, the outer rotating element 1 idles without contacting the cambered-surface stop surface 10a of the friction block assembly 10, and hence the inner rotating element 2 and the outer rotating element 1 are out of synchronization to maintain their respective rotation states.

The overrunning clutch of the present invention uses the first traction element on the first propeller assembly to cooperate with the drive element, drives the first traction to move through the friction generated by rotation of the drive element and draws it into the groove in the first propeller assembly, and uses the inclined surface in the groove to cooperate with the second elastic element of the first propeller assembly for completion of the traction element snapping with the drive element, the first propeller assembly, then changes the diameter, adjusts the synchronous performance of friction block assembly through the first propeller assembly pushing the synchronized push-block assembly to sway so that the traction element, first propeller assembly, friction block assembly can achieve cambered-surface stop with the drive element to follow the drive element for synchronous rotation; subsequently, the first propeller assembly strikes the friction block assembly and is relatively stationary to push the friction block assembly for generating reverse rotation relative to the driven element so that the wedge assembly is wedged to generate a radial pressure on the friction block assembly, then the friction block assembly achieves lower-pair cambered-surface stop with the drive element and locks with the driven element by wedging, respectively, lastly completing transmission of torque.

Through the cambered-surface cooperation between the friction block assembly and the rotating elements, the transmission of torque can be truly achieved and the capacity of withstanding torque of the overrunning clutch can be maximally improved by the friction block assembly conducting lower-pair cambered-surface stop with the drive element and wedging to lock tightly with the driven element, thereby being able to be applied in a variety of working occasions of high-speed, large torque and strong impact. Compared with prior art, the overrunning clutch of the present invention has a more sensitive reaction, better wear resistance performance, ultra-long service life, and serious heat phenomenon will not occur even after a long-time, high-intensity operation.

The above descriptions are merely specific implementation manners of the present application. It should be noted that those skilled in the art may make some improvements and modifications without departing from the principle of the present application. These improvements and modifications should also be regarded as the scope of protection of this application.

What is claimed is:

1. An overrunning clutch, comprising:
an outer rotating element including an annular first rotating ring;
an inner rotating element provided in the outer rotating element, including an annular second rotating ring concentric with the first rotating ring;
a friction block assembly including a plurality of friction blocks forming a closed ring shape by connecting end to end successively, two adjacent friction blocks overlapping partially, the friction block assembly being arranged between the first rotating ring and the second rotating wherein an outer surface of each friction block is provided with a wedge surface and an inner surface of each friction block is a cambered-surface stop surface, and each friction block is provided with a first thruster mounting part close to a leading end thereof, which includes a first limit part close to an end surface of the leading end and a second limit part away from the end surface of the leading end;
a roller assembly provided between the first rotating ring and the wedge surface of the friction block assembly for allowing the outer rotating element to rotate unidirectionally relative to the friction block assembly, wherein the roller assembly includes a plurality of parallelly spaced rollers and the wedge surface includes a plurality of recessed parts and raised parts arranged alternately, the rollers achieving wedging or de-wedging between the first rotating ring and the friction block assembly by rolling towards or away from the raised parts;
a first thruster assembly arranged slidably on the first thruster mounting part in a circumferential direction and limited by the first limit part and the second limit part, the first thruster assembly including a first traction element, which is driven by the inner rotating element for a non-slip-fit or a loose-fit with the second rotating ring;
a first elastic element arranged between the two adjacent friction blocks for elastically pushing the two adjacent friction blocks in opposite directions to keep the two adjacent friction blocks away from each other; and
a synchronized push-block assembly provided at an overlap of the two adjacent friction blocks for overcoming an action of the first elastic element under a thrust of the first thruster assembly to keep the two adjacent friction blocks close to each other.

2. The overrunning clutch according to claim 1, wherein a number of the friction blocks is two.

3. The overunning clutch according to claim 1, wherein, the roller assembly further comprises a roller frame including two parallel supporting plates and a spacing retaining element provided between the two supporting plates, each supporting plate being provided with a plurality of spaced long holes, a head on both ends of each roller penetrating through the long holes and slidable in a length direction of the long holes, and
wherein the supporting plates are provided at both axial end surfaces of the friction block.

4. The overunning clutch according to claim 3, wherein, the roller frame further includes roller pre-loading elements having one end fixed with respect to each supporting plate, each of the roller pre-loading elements pushing the head of the rollers along the length direction of the long holes.

5. The overunning clutch according to claim 4, wherein each roller pre-loading element is an elastic tab and an inside of each supporting plate is provided with a pre-loading element accommodating slot communicating with the long holes, and wherein each roller pre-loading element is in a state of compression to snap into the pre-loading element accommodating slot with one end thereof pushing elastically the head.

6. The overrunning clutch according to claim 1, wherein the end surface at the leading end of each friction block is provided with a first lapping part, and an end surface at a trailing end of each friction block is provided with a second lapping part, the first lapping part of each friction block being arranged overlapping with the second lapping part of an adjacent friction block, and wherein the synchronized push-block assembly is provided with a push arm for being pushed by the first thruster assembly and a push-block body driving the two adjacent friction blocks to keep the two adjacent friction blocks close to each other.

7. The overrunning clutch according to claim 6, wherein the first lapping part and the second lapping part are provided with a first insert hole and a second insert hole respectively, the synchronized push-block assembly simultaneously penetrating through the first insert hole and the second insert hole and compressing the first elastic element under the thrust of the first thruster assembly to increase an amount of overlap of the first lapping part and the second lapping part.

8. The overrunning clutch according to claim 7, wherein opposed surfaces of the synchronized push-block assembly are provided with a first cooperating part and a second cooperating part including a concave arc respectively, a side wall of the first insert hole close to the end surface of the leading end and a side wall of the second insert hole close to the end surface of the trailing end are plugged movably with a pin used for contacting cooperation with the first cooperating part and the second cooperating part.

9. The overrunning clutch according to claim 1, wherein the first thruster assembly further includes a third elastic element provided at the leading end thereof, which is used to push the first thruster assembly towards the second limit part.

10. The overrunning clutch according to claim 1, wherein the first thruster assembly includes a first fixed base, and a first protruding block being provided to protrude radially inward from the first fixed base, and wherein the first thruster mounting part of each friction block is provided with a first through hole extending in the circumferential direction, the first protruding block being slidably provided in the first through hole along the circumferential direction.

11. The overrunning clutch according to claim 10, wherein the first traction element is a roller and a radially outer portion of the first thruster assembly is provided with a first groove accommodating the first traction element, and wherein a surface of the first groove that faces radially inward is provided with a first inclined surface on a side close to the leading end of the first thruster assembly such that the closer to the leading end of the first thruster assembly, the smaller a radial distance of the first inclined surface from the second rotating ring.

12. The overrunning clutch according to claim 11, wherein the first thruster assembly further includes a second elastic element provided between the first rotating ring and the first traction element, the second elastic element pushing the first traction element towards the second rotating ring to make the first traction element contact elastically with the second rotating ring.

13. The overrunning clutch according to claim 12, wherein the first thruster assembly further includes a first movable tab, and a surface of the first fixed base that faces radially inward is provided with a first limit groove, the first movable tab being arranged in the first limit groove, and wherein the second elastic element is compressed between the first movable tab and the first limit groove, and the first fixed base cooperates with the first movable tab to form the first groove.

14. The overrunning clutch according to claim 11, wherein the first thruster assembly is provided with a first pre-loading assembly disposed on a side of the first groove away from the first inclined surface for elastically pushing against the first traction element towards the first inclined surface.

15. The overrunning clutch according to claim 11, wherein the leading end of the first propeller assembly is provided with a spring decompression assembly used for pushing the synchronized push-block assembly, the spring decompression assembly being compressed to generate elastic deformation after the synchronized push-block assembly is stationary relative to the friction block assembly.

16. The overrunning clutch according to claim 10, wherein the first thruster assembly further includes a plurality of first rolling needles for contacting with the first rotating ring arranged between the first fixed base and the first rotating ring.

17. The overrunning clutch according to claim 11, wherein the first thruster assembly includes a plurality of the first grooves and each of the first grooves is provided with one first traction element inside.

18. An overrunning clutch, comprising:
    an outer rotating element including an annular first rotating ring;
    an inner rotating element provided in the outer rotating element, including an annular second rotating ring concentric with the first rotating ring;
    a friction block assembly including a plurality of friction blocks forming a closed ring shape by connecting end to end successively, the friction block assembly being arranged between the first rotating ring and the second rotating ring, wherein an inner surface of each friction block is provided with an wedge surface and an outer surface of each friction block is a cambered-surface stop surface, and each friction block is provided with a first thruster mounting part close to a leading end thereof, which includes a first limit part close to an end surface of the leading end and a second limit part away from the end surface of the leading end;
    a roller assembly provided between the second rotating ring and the wedge surface of the friction block assembly for allowing the inner rotating element to rotate unidirectionally relative to the friction block assembly, wherein the roller assembly includes a plurality of parallelly spaced rollers and the wedge surface includes a plurality of recessed parts and raised parts arranged alternately, the rollers achieving wedging or de-wedging between the second rotating ring and the friction block assembly by rolling towards or away from the raised parts;
    a first thruster assembly arranged slidably on the first thruster mounting part in a circumferential direction and limited by the first limit part and the second limit part, the first thruster assembly including a first traction element, which is driven by the outer rotating element for a non-slip-fit or a loose-fit with the first rotating ring;

a first elastic element, both ends of the first elastic element being respectively fixed on the end surfaces of two adjacent friction blocks for drawing the two adjacent friction blocks; and a synchronized push-block assembly provided between the end surfaces of the two adjacent friction blocks for overcoming an action of the first elastic element under a thrust of the first thruster assembly to separate the two adjacent friction blocks.

19. The overrunning clutch according to claim 18, wherein, the roller assembly further comprises a roller frame including two parallel supporting plates and a spacing retaining element provided between the two supporting plates, each supporting plate being provided with a plurality of spaced long holes, a head on both ends of each roller penetrating through the long holes and slidable in a length direction of the long holes, and wherein the supporting plates are provided at both axial end surfaces of the friction block.

20. The overrunning clutch according to claim 19, wherein, the roller frame further includes roller pre-loading elements having one end fixed with respect to each supporting plate, each of the roller pre-loading elements pushing the head of the rollers along the length direction of the long holes.

21. The overrunning clutch according to claim 18, wherein opposed surfaces of the synchronized push-block assembly are provided with a first cooperating part and a second cooperating part including a concave arc respectively, and the end surface of the leading end of each friction block and an end surface of a trailing end of each friction block are plugged movably with a pin used for contacting cooperation with the first cooperating part and the second cooperating part, respectively.

22. The overrunning clutch according to claim 18, wherein the first thruster assembly further includes a third elastic element provide at the leading end thereof, which is used to push the first thruster assembly towards the second limit part.

23. The overrunning clutch according to claim 18, wherein the first thruster assembly includes a first fixed base, and a first protruding block being provided to protrude radially outward from the first fixed base, and wherein the first thruster mounting part of each friction block is provided with a first through hole extending in the circumferential direction, the first protruding block being slidably provided in the first through hole along the circumferential direction.

24. The overrunning clutch according to claim 23, wherein the first traction element is a roller and a radially inner portion of the first thruster assembly is provided with a first groove accommodating the first traction element, and wherein a surface of the first groove that faces radially outward is provided with a first inclined surface on a side close to the leading end of the first thruster assembly such that the closer to the leading end of the first thruster assembly, the smaller a radial distance of the first inclined surface from the first rotating ring.

25. The overrunning clutch according to claim 24, wherein the first thruster assembly further includes a first movable tab, and a surface of the first fixed base that faces radially outward is provided with a first limit groove, the first movable tab being arranged in the first limit groove, and wherein a second elastic element is compressed between the first movable tab and the first limit groove, and the first fixed base cooperates with the first movable tab to form the first groove.

26. The overrunning clutch according to claim 24, wherein the first thruster assembly is provided with a first pre-loading assembly disposed on a side of the first groove away from the first inclined surface for elastically pushing the first traction element towards the first inclined surface.

27. The overrunning clutch according to claim 24, wherein the leading end of the first thruster assembly is provided with a spring decompression assembly used for pushing the synchronized push-block assembly, the spring decompression assembly being compressed to generate elastic deformation after the synchronized push-block assembly is stationary relative to the friction block assembly.

28. The overrunning clutch according to claim 23, wherein the first thruster assembly further includes a plurality of first rolling needles for contacting with the second rotating ring arranged between the first fixed base and the second rotating ring.

* * * * *